United States Patent
Rucker et al.

(10) Patent No.: US 12,138,831 B2
(45) Date of Patent: Nov. 12, 2024

(54) MOLD AND METHOD OF MANUFACTURING FOR FIBER-REINFORCED POLYMERIC SPRINKLER HEAD PART

(71) Applicant: Tyco Fire Products LP, Lansdale, PA (US)

(72) Inventors: William K. Rucker, Cranston, RI (US); Manuel R. Silva, Jr., Cranston, RI (US); Lyle J. Miller, Milford, CT (US); Daniel Cross, South Kingston, RI (US); Steven L. Shields, Lubbock, TX (US); Jose L. Almeida, Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 143 days.

(21) Appl. No.: 17/797,689

(22) PCT Filed: Jan. 25, 2021

(86) PCT No.: PCT/IB2021/050554
§ 371 (c)(1),
(2) Date: Aug. 4, 2022

(87) PCT Pub. No.: WO2021/156699
PCT Pub. Date: Aug. 12, 2021

(65) Prior Publication Data
US 2023/0100828 A1     Mar. 30, 2023

Related U.S. Application Data
(60) Provisional application No. 62/971,557, filed on Feb. 7, 2020.

(51) Int. Cl.
*B29C 45/00* (2006.01)
*B29C 45/26* (2006.01)
(Continued)

(52) U.S. Cl.
CPC ...... *B29C 45/0025* (2013.01); *B29C 45/0005* (2013.01); *B29C 45/2618* (2013.01);
(Continued)

(58) Field of Classification Search
CPC ......... B29C 45/00; B29C 45/27; B29C 45/26; B29C 45/0025; B29C 45/2708;
(Continued)

(56) References Cited

U.S. PATENT DOCUMENTS 5,556,582 A * 9/1996 Kazmer ................. B29C 45/77
                                                               264/328.8
9,849,319 B2   12/2017 Ringer
(Continued)

FOREIGN PATENT DOCUMENTS

EP     0 998 401 B1    1/2002
EP     3 120 987 A1    1/2017
(Continued)

OTHER PUBLICATIONS

Korean Intellectual Property Office (KIPO); International Search Report and Written Opinion; International Application No. PCT/IB2021/050554; dated Apr. 23, 2021; 10 pages.

*Primary Examiner* — Christopher M Rodd
*Assistant Examiner* — Shibin Liang
(74) *Attorney, Agent, or Firm* — Foley & Lardner LLP

(57) ABSTRACT

An injection mold for producing a sprinkler head part and related injection molding methods are described. The sprinkler head part includes a first, second, third and fourth mold portions. The first and second mold portions include first and second shaping elements structured to cooperatively form a body including a substantially cylindrical portion and a substantially planar portion, and two frame arms extending from the substantially planar portion of the body. The third mold portion includes a shaping element structured to form (Continued)

an orifice in the body of the sprinkler head. The fourth mold portion includes a shaping element structured to form a cross member connecting the two frame arms. The injection methods include injecting a composite material in molten form into the mold to form the molded sprinkler head part. The composite material includes thermoplastic polymeric resin and a plurality of reinforcing fibers dispersed in the resin.

20 Claims, 14 Drawing Sheets

(51) Int. Cl.
*B29C 45/27* (2006.01)
*B29K 71/00* (2006.01)
*B29K 79/00* (2006.01)
*B29K 81/00* (2006.01)
*B29K 105/00* (2006.01)
*B29L 1/00* (2006.01)

(52) U.S. Cl.
CPC .. *B29C 45/2708* (2013.01); *B29C 2045/0027* (2013.01); *B29K 2071/00* (2013.01); *B29K 2079/085* (2013.01); *B29K 2081/04* (2013.01); *B29K 2105/0094* (2013.01); *B29K 2995/0077* (2013.01); *B29L 2001/00* (2013.01)

(58) Field of Classification Search
CPC . B29C 45/0005; B29C 45/2618; B29C 45/37; B29K 2071/00
See application file for complete search history.

(56) References Cited

U.S. PATENT DOCUMENTS

| | | |
|---|---|---|
| 9,849,320 B2 | 12/2017 | Ringer |
| 10,010,730 B2 | 7/2018 | Abels et al. |
| 10,179,255 B2 | 1/2019 | Almeida et al. |
| 10,427,344 B1 | 10/2019 | Tseng et al. |
| 2011/0150602 A1* | 6/2011 | Sieper ................ B29C 45/0005 |
| | | 264/108 |
| 2014/0124974 A1 | 5/2014 | Williams |
| 2020/0114558 A1* | 4/2020 | Hukatsu ................ B29C 70/12 |
| 2020/0172670 A1* | 6/2020 | Brule ................ B29C 71/0063 |
| 2020/0346061 A1* | 11/2020 | Meyer ................ B05B 1/265 |

FOREIGN PATENT DOCUMENTS

| | | | | |
|---|---|---|---|---|
| WO | WO-00/35648 A1 | | 6/2000 | |
| WO | 2018221187 | * | 12/2018 | ............ B29C 45/37 |
| WO | 2019/048802 | * | 3/2019 | ............ B29C 71/02 |

* cited by examiner

MOLD AND METHOD OF MANUFACTURING FOR FIBER-REINFORCED POLYMERIC SPRINKLER HEAD PART

CROSS-REFERENCE TO RELATED APPLICATIONS

This application is the U.S. National Stage of International Patent Application PCT/IB2021/050554, filed Jan. 25, 2021 and titled "MOLD AND METHOD OF MANUFACTURING FOR FIBER-REINFORCED POLYMERIC SPRINKLER HEAD PART", which claims priority to and the benefit of U.S. Provisional Patent Application No. 62/971,557, filed Feb. 7, 2020 and titled "MOLD AND METHOD OF MANUFACTURING FOR FIBER-REINFORCED POLYMERIC SPRINKLER HEAD PART", each of which is incorporated herein by reference in its entirety.

BACKGROUND

Automatic sprinkler systems include a network of pressurized pipes that connect a water source to a plurality of sprinkler heads. In most systems, each of the plurality of sprinkler heads is automatically activated by a thermal release element in response to heat from an external source in the environment, e.g., a fire. When activated, a release valve in the sprinkler head opens and the sprinkler head dispenses water over the fire. The sprinkler heads typically include components made primarily from metal such as brass. To reduce manufacturing cost, such sprinklers heads typically include many relatively simple parts that can be easily produced using common metal forming techniques (e.g., casting, drilling, tapping, stamping, etc.). These components are then assembled together to form the sprinkler head.

SUMMARY

The present disclosure relates generally to a mold and method for manufacturing a polymeric sprinkler head part for use in permanently-installed fire-fighting equipment, such as automatic sprinkler systems. The polymeric sprinkler head part is made of a composite material including a thermoplastic polymeric resin and a plurality of reinforcing fibers.

One embodiment provides an injection mold for producing a sprinkler head part. The injection mold part includes a first mold portion, a second mold portion, a third mold portion, and a fourth mold portion.

The first and second mold portions include first and second shaping elements configured to cooperatively form a body including a substantially cylindrical portion and a substantially planar portion, a first frame arm extending from the substantially planar portion of the body, and a second frame arm extending from the substantially planar portion of the body.

The third mold portion includes a third shaping element configured to form an orifice in the body. The orifice has a distal end formed in the substantially planar portion and a proximal end spaced from the substantially planar portion. The third shaping element includes a distal end configured to form the distal end of the orifice and a proximal end configured to form the proximal end of the orifice. The third shaping element tapers towards a center line of the orifice from the proximal end to the distal end.

The fourth mold portion includes a fourth shaping element and a fifth shaping element. The fourth shaping element is structured to form a cross member connecting the first frame arm and the second frame arm. The fourth shaping element is structured to form first and second guide pin holes in the cross member. The first and second guide pin holes are oriented such that an orifice center line substantially bisects a line drawn between a center of the first guide pin hole and a center of the second guide pin hole.

The fifth shaping element is structured to cooperate with the third shaping element to form the orifice. The fifth shaping element is configured to form a beveled surface surrounding the sealing surface. The beveled surface extends away from an orifice center line. An end of the third shaping element is configured to abut an end of the fifth mold portion to form a sealing surface surrounding the distal end of the orifice. The end of the fifth shaping element has a diameter that is wider than a diameter of the end of the third shaping element.

One embodiment provides a method of injecting a composite material in molten form into the mold to form a molded product. During injection, the molten composite material is controlled to provide the molded product having a fiber orientation predominantly in a direction parallel to an axial direction of the first and second frame arms. Injection of the molten composite material may also be controlled to provide the molded product having knit lines substantially centered in the cross member. Injection of the molten form of the composite material may also be controlled to provide the molded product without any knit lines in the any of the first and second frame arms, the first and second frame arm/cross member junctions, and the first and second frame arm/body junctions.

In one embodiment, a method for producing a sprinkler head part includes injecting a composite material in molten form into a mold to form a molded product. The mold includes a first mold portion, a second mold portion, a third mold portion, and a fourth mold portion. The first and second mold portions include first and second shaping elements structured to cooperatively form a body, which includes a substantially planar portion, a first frame arm extending from the substantially planar portion, the first frame arm defining a first frame arm axis, and a second frame arm extending from the substantially planar portion, the second frame arm defining a second frame arm axis. The third mold portion includes a third shaping element structured to form an orifice in the body which extends through the substantially planar portion. The fourth mold portion includes a fourth shaping element structured to form a cross member connecting the first frame arm and the second frame arm. Injection of the molten composite material is controlled to provide the molded product having a fiber orientation predominantly in a direction parallel to an axial direction of the first and second frame arms.

In one embodiment, a method for producing a sprinkler head part includes injecting composite material in molten form into a mold to form a molded product. The mold includes a first mold portion, a second mold portion, a third mold portion, and a fourth mold portion. The first and second mold portions include first and second shaping elements structured to cooperatively form a body, which includes a substantially planar portion, a first frame arm extending from the substantially planar portion at a first frame arm/planar portion junction and a second frame arm extending from the substantially planar portion at a second frame arm/planar portion junction. The third mold portion includes a third shaping element structured to form an orifice in the body of the sprinkler head. The fourth mold portion includes a fourth shaping element structured to from a cross member between the first frame arm at a first frame arm/cross member junction and the second frame arm at a second frame arm/cross member junction. Injection of the molten form of the composite material is controlled to provide the molded product without any knit lines in the any of the first and second frame arms, the first and second frame arm/cross member junctions, and the first and second frame arm/body junctions.

In one embodiment, a method for producing a sprinkler head part includes injecting a composite material in molten form into a mold to form a molded product. The mold includes a first mold portion, a second mold portion, a third mold portion, and a fourth mold portion. The first and second mold portions include first and second shaping elements structured to cooperatively form a body, which includes a substantially planar portion, a first frame arm extending from the substantially planar portion at a first frame arm/planar portion junction and a second frame arm extending from the substantially planar portion at a second frame arm/planar portion junction. The third mold portion includes a third shaping element structured to form an orifice in the body. The orifice is oriented around an orifice center line centered therein. The fourth mold portion includes a fourth shaping element structured to form a cross member connecting the first frame arm and the second frame arm, The mold has two injection gates located in a substantially symmetrical orientation with respect to the orifice center line.

In one embodiment, a method for producing a sprinkler head part includes injecting a composite material in molten form into a mold to form a molded product. The mold includes a first mold portion, a second mold portion, a third mold portion, and a fourth mold portion. The first and second mold portions include first and second shaping elements structured to cooperatively form a body, which includes a substantially planar portion, a first frame arm extending from the substantially planar portion at a first frame arm/planar portion junction and a second frame arm extending from the substantially planar portion at a second frame arm/planar portion junction. The third mold portion includes a third shaping element structured to form an orifice in the body. The fourth mold portion includes a fourth shaping element structured to from a cross member between the first frame arm at a first frame arm/cross member junction and the second frame arm at a second frame arm/cross member junction. The mold has two injection gates each disposed at a frame arm/cross member junction or each disposed at a frame arm/planar portion junction.

The composite material used in the injection molding methods described herein includes a thermoplastic resin, which exhibits good chemical resistant, and a plurality of reinforcing fibers dispersed in the resin. The thermoplastic resin is typically a heat resistant resin and commonly also exhibits excellent creep resistance and low moisture absorption. For example, the thermoplastic resin commonly has a peak melting temperature of at least about 250° C. (as determined pursuant to ASTM D3418) and a water absorption of no more than about 0.5 wt. % and, often no more than about 0.3 wt. % (as determined pursuant to ASTM D570). The composite material typically has a low coefficient of thermal expansion, e.g., no more than about 200 microns/m and many instances no more than about 100 microns/m (as determined pursuant to ASTM E831). A variety of different high temperature thermoplastic resins may be used to form the present composite material. Suitable examples include polyphenylene Sulfide (PPS), polyetheretherketone (PEEK), polyetherketoneketone (PEKK), polyphthalamide (PPA), polyimide (TPI), polyamide (PA), polysulfone (PSU), polyethersulfone (PES), polyetherimide (PEI), liquid crystal polymer (LCP) and mixtures of two or more such resins. Particularly suitable thermoplastic resins include polyphenylenesulfide, polyphthalamide, polyetheretherketone, polyetherimide and mixtures thereof. Suitable reinforcing fibers commonly used in the present composite materials include glass fibers, carbon fibers, aramid fibers or mixtures of two or more such fibers.

In one embodiment, the composite material includes thermoplastic resin and reinforcing fibers; where the thermoplastic resin has a peak melting temperature of at least about 250° C. (as determined pursuant to ASTM D3418); water absorption of no more than about 0.3 wt. % (as determined pursuant to ASTM D570). The composite material commonly has a coefficient of thermal expansion of no more than about 100 microns/m (as determined pursuant to ASTM E831). The thermoplastic resin may include polyphenylenesulfide, polyphthalamide, polyetheretherketone (PEEK), polyetherimide or a combination of two or more thereof. The reinforcing fibers may include glass fibers, carbon fibers, aramid fibers or a mixture of two or more thereof. Such a composite material may exhibit an elongation at break of no more than about 3% (as determined pursuant to ASTM D638). Such a composite material may exhibit a compressive strength of at least about 150 MPa (as determined pursuant to ASTM D695). The composite material may have a tensile strength of at least about 150 MPa, and, in some instances, may have a tensile strength of at least about 200 or at least about 250 MPa (as determined pursuant to ASTM D638). Such a composite material may exhibit a transverse molding shrinkage of no more than about 1% (as determined pursuant to ISO 294-24, 2577). Such a composite material may have a melt flow index at 400° C. of at least about 1 g/10 min and, often at least about 10 g/10 min.

In one embodiment, an injection mold for producing a sprinkler head part includes a first mold portion, a second mold portion, a third mold portion, and a fourth mold portion. The first and second mold portions including first and second shaping elements structured to cooperatively form a sprinkler head including a body including a substantially cylindrical portion defining a central longitudinal axis and a substantially planar portion, a first frame arm extending from the substantially planar portion of the body, and a second frame arm extending from the substantially planar portion of the body. A first gate is positioned at or proximate an end at of the first frame arm. The first gate is structured to introduce a molten form of a polymeric composite material into the mold. A second gate is positioned at or proximate an end at of the second frame arm. The second gate is structured to introduce the molten form of the polymeric composite material into the mold. The first and second gates are substantially symmetrically located with respect to the central longitudinal axis. In some embodiments, the first and second gates may be located in a horizontal plane. The horizontal plane is perpendicular to the central longitudinal axis.

In one embodiment, an injection mold for producing a sprinkler head part includes a first mold portion, a second mold portion, a third mold portion, and a fourth mold portion. The first and second mold portions include first and second shaping elements structured to cooperatively form a sprinkler head including a body including a substantially cylindrical portion defining a central longitudinal axis and a substantially planar portion, a first frame arm extending from the substantially planar portion of the body, and a second frame arm extending from the substantially planar portion of the body. A first gate is positioned at or proximate an end at of the first frame arm. The first gate is structured to introduce a molten form of a composite material into the mold. A second gate is positioned at or proximate an end at of the second frame arm. The second gate is structured to introduce the molten form of the composite material into the mold. The first and second gates are located so that the molten form of the composite material flows into the mold such that the reinforcing fibers throughout the first and second frame arms are oriented substantially parallel to the central longitudinal axis. In some embodiments, the first and second gates may be located so that the molten form of the composite material flows into the mold such that no knit lines are formed in the first or second frame arms.

DETAILED DESCRIPTION

Figure 1:
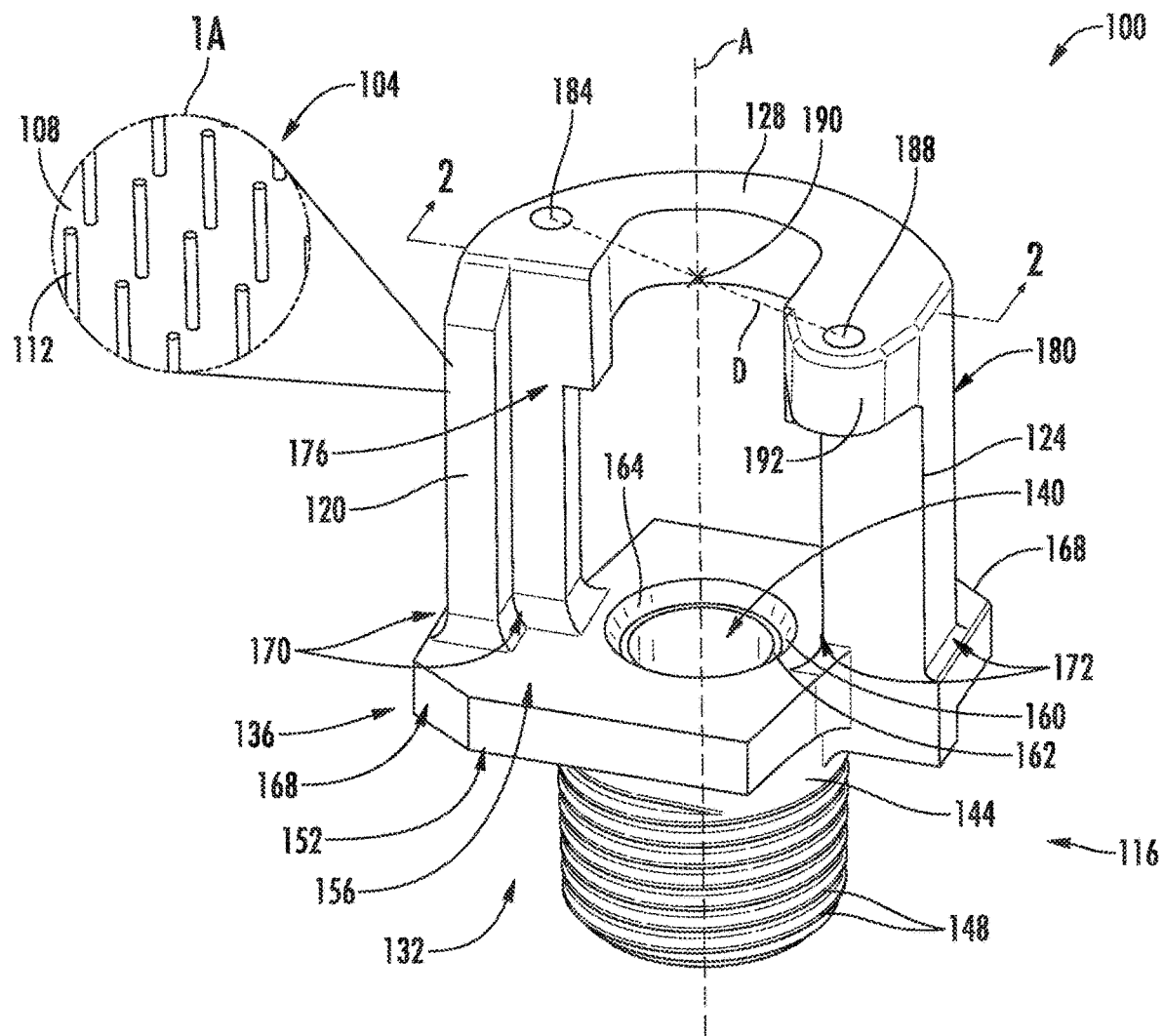
FIG. 1 illustrates a perspective view of a polymeric sprinkler head according to an exemplary embodiment.
Figure 2:
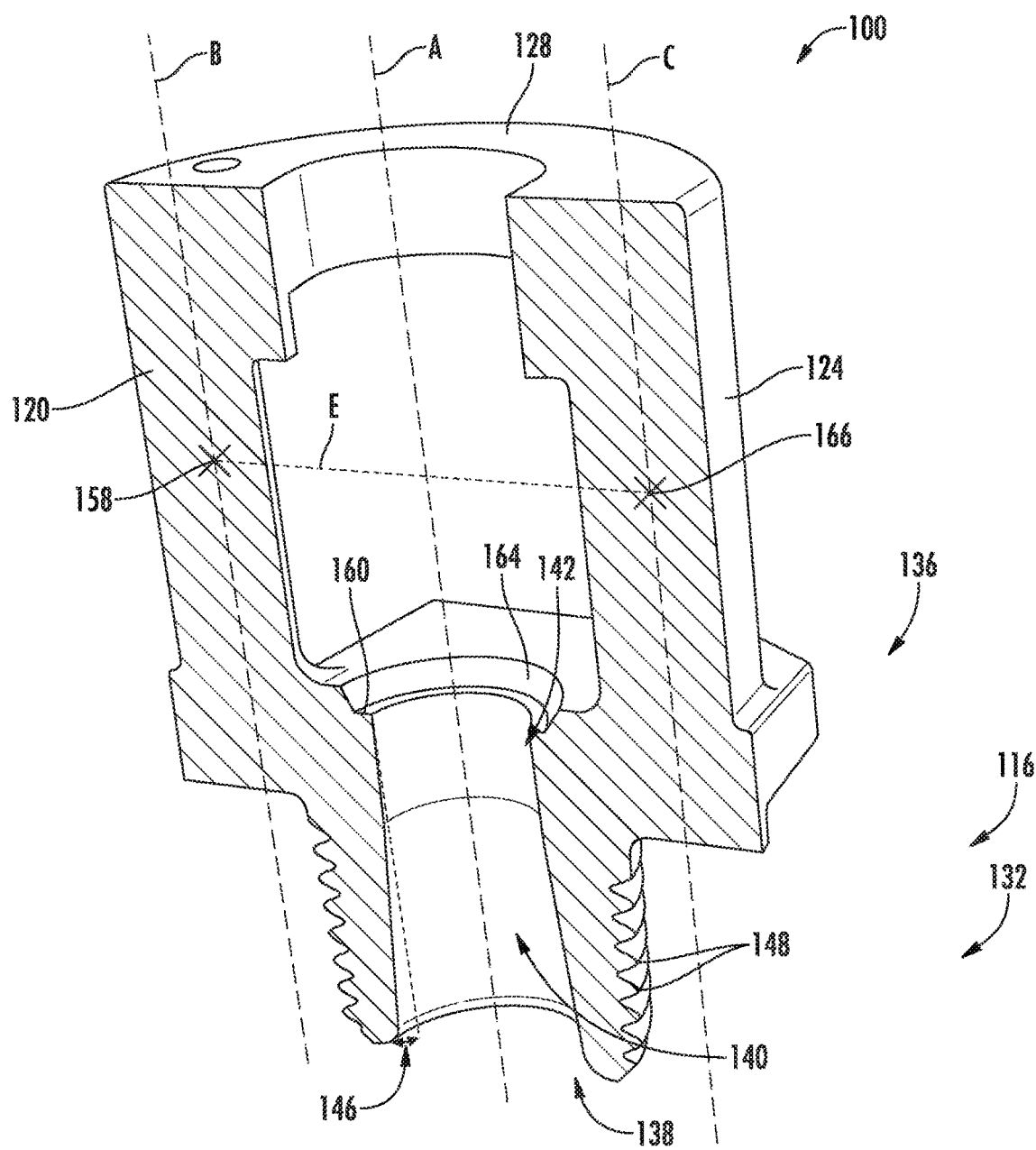
FIG. 2 illustrates a cross-sectional view of the polymeric sprinkler head of FIG. 1 taken along the lines 2-2.

FIG. 1 illustrates a sprinkler head part 100 made from a composite material 104. FIG. 2 illustrates a section view of the sprinkler head part 100 taken along the lines 2-2 shown in FIG. 1. In the illustrated embodiment, the composite material 104 includes a thermoplastic polymeric resin 108 and a plurality of dispersed reinforcing fibers 112, as illustrated in inset 1A. The sprinkler head part 100 includes a body 116, a first frame arm 120, a second frame arm 124, and a cross member 128. The sprinkler head part 100 is manufactured as a single part by injection molding.

The body 116 includes a substantially cylindrical portion 132 and a substantially planar portion 136. The substantially cylindrical portion 132 includes an orifice 140. A center line of the orifice 140 is shown by a longitudinal axis A. An exterior surface 144 of the substantially cylindrical portion 132 includes a plurality of threads 148 structured to engage piping (not shown) of the sprinkler system. As shown in FIG. 2, the exterior surface 144 of the cylindrical portion 132 may be tapered such that a diameter of the end of the substantially cylindrical portion 132 proximate the substantially planar portion 136 is wider than a diameter of the substantially cylindrical portion 132 proximate a proximal end 138 of the orifice 140. In some embodiments, the exterior surface 114 of the substantially cylindrical portion may not be tapered. As used herein, the word "proximal" is used to refer to a portion of a part of the sprinkler head part 100 or a void in the mold 300 structured to form the sprinkler head part 100 that is closest to the open end of the substantially cylindrical portion 132. The word "distal" is used to refer to a portion of a part of the sprinkler head part 100 or a void in the mold 300 structured to form the sprinkler head part 100 that is furthest from the open end of the substantially cylindrical portion 132.

As shown in FIG. 2, the orifice 140 has a proximal end 138 and a distal end 142. In the illustrated embodiment, the orifice 140 is tapered, such that a diameter of the distal end 142 of the orifice 140 is smaller than a diameter of the proximal end 138 of the orifice 140. The orifice 140 may have a taper angle 146 (FIG. 2) that is from about 0.5 degrees to about 16 degrees. Typically, the orifice 140 may taper from about 2 degrees to about 10 degrees. In some instances, the taper angle 916 is about 5 to about 10 degrees. In some embodiments, the orifice 140 may not be tapered.

The substantially planar portion 136 extends substantially perpendicular to the longitudinal axis A. The substantially planar portion 136 includes opposing first and second surfaces 152, 156. The first surface 152 extends from the distal end of the cylindrical portion 132. The orifice 140 extends through the planar portion 136. A sealing surface 160 surrounds the distal end 142 of the orifice 140. In some embodiments, the sealing surface 160 includes a groove 162. The sealing surface 160 is structured to form a seat for a thermally-actuated valve (not shown). A beveled surface 164 extends between the second surface 156 of the planar portion 136 and the sealing surface 160. The beveled surface 164 is tapered so that the beveled surface 164 opens away from the axis A in the orientation illustrated in FIGS. 1 and 2. The substantially planar portion 136 further includes opposing wrench engagement surfaces 168. The wrench engagement surfaces 168 are structured to engage the driving surfaces of a wrench when a wrench is used to engage the sprinkler head part 100 with the piping of the sprinkler system (not shown).

The first frame arm 120 extends from the second surface 156 of the substantially planar portion 136 at a first frame arm/planar portion junction 170. An axial direction of the first frame arm 120 is shown by a first frame arm axis B (FIG. 2). The second frame arm 124 extends from the second surface 156 of the substantially planar portion 136 at a second frame arm/planar portion junction 172. Point 158 indicates a center of the first frame arm axis B. An axial direction of the second frame arm 124 is shown by a second frame arm axis C (FIG. 2). Point 166 indicates a center of the second frame arm axis C. Line E connects the centers 158, 166 of the first and second frame arm axes B, C. The first frame arm axis B and the second frame arm axis C are substantially parallel to the longitudinal axis A. The reinforcing fibers in the first frame arm 120 and the second frame arm 124 are substantially aligned with the frame arm axes B and C, respectively.

The cross member 128 is coupled to the first frame arm 120 at a first frame arm/cross member junction 176 and is coupled to the second frame arm 124 at a second frame arm/cross member junction 180. In the illustrated embodiment, the cross member 128 is substantially arcuate. In other embodiments, the cross member 128 may be another shape, such as annular. The cross member 128 includes a first guide pin hole 184 and a second guide pin hole 188. The second guide pin hole 188 is positioned on a protrusion 192. In some embodiments, the guide pin holes 184, 188 are circular, as shown in FIG. 1. In other embodiments, the guide pin holes 184, 188 may have other shapes, such as the bean-like shape shown in FIGS. 11 and 12.

The first and second guide pin holes 184, 188 are structured to receive deflector mounting pins when a deflector (not shown) is engaged with the sprinkler head part 100. The deflector is structured to direct a flow of water through the orifice onto a fire when the sprinkler system including the sprinkler head part 100 is deployed. In the illustrated embodiment, the first and second guide pin holes 184, 188 are oriented relative to the axis A such that the axis A intersects a midpoint 190 of a line D drawn between the centers of the first and second guide pin holes 184, 188. In other embodiments, the axis A may intersect the line D near the midpoint 190 of the line D. The cross member 128 is shaped to maintain a relative orientation of the guide pin holes 184, 188 and the axis A during the molding and cooling processes.

As is described in greater detail below, the sprinkler head part 100 is formed as a single part by injection molding the composite material into a mold, such as the mold 300 illustrated in FIGS. 3-9. In the illustrated embodiment, the mold 300 includes two symmetrically-oriented injection gates into which molten composite material is injected into an interior of the mold 300, forming two flows of molten composite material within the mold 300. Knit lines form where the two flows of molten composite material converge. Although the thermoplastic polymeric resin of the two flows of molten composite material can fuse when the flows of molten composite material converge, the reinforcing fibers in the molten composite material do not cross the knit line. The sprinkler head part 100 does not include any knit lines in the first frame arm 120, the second frame arm 124, the first frame arm/planar portion junction 170, the second frame arm/planar portion junction 172, the first frame arm/cross member junction 176, or the second frame arm/cross member junction 180.

The sprinkler head part 100 (FIG. 1) is formed by an injection molding process. Referring now to FIGS. 3-9, a mold 300 for use in the injection molding process includes a first mold portion 304, a second mold portion 308, a third mold portion 312, and a fourth mold portion 316. The mold 300 is movable between a use configuration, in which the mold portions 304-316 abut each other to form a cavity structured to form the sprinkler head part 100 there between and an open configuration in which the sprinkler head part 100 can be removed from the mold 300. In the illustrated embodiment, the third mold portion 312 is fixed (immobile). The first and second mold portions 304, 308 are movable in the direction shown by arrow E. The fourth mold portion 316 is movable in the direction shown by arrow F. In other embodiments, other mold portions may be fixed and the third mold portion 312 may be movable.

Figure 3:
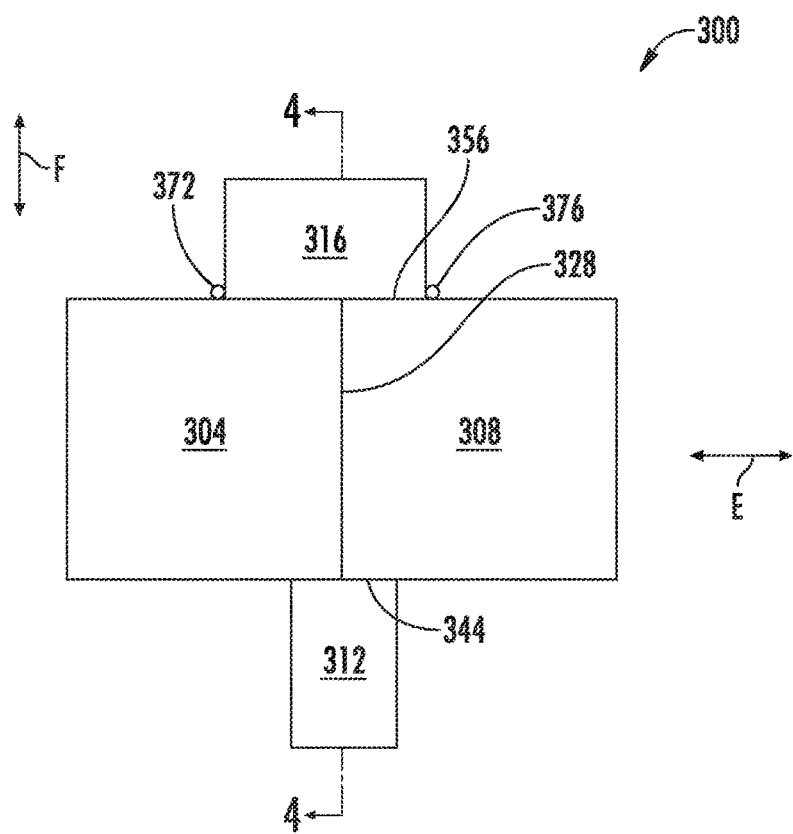
FIG. 3 illustrates a perspective view of an injection mold for forming the polymeric sprinkler head of FIG. 1 in a use configuration according to an exemplary embodiment.
Figure 4:
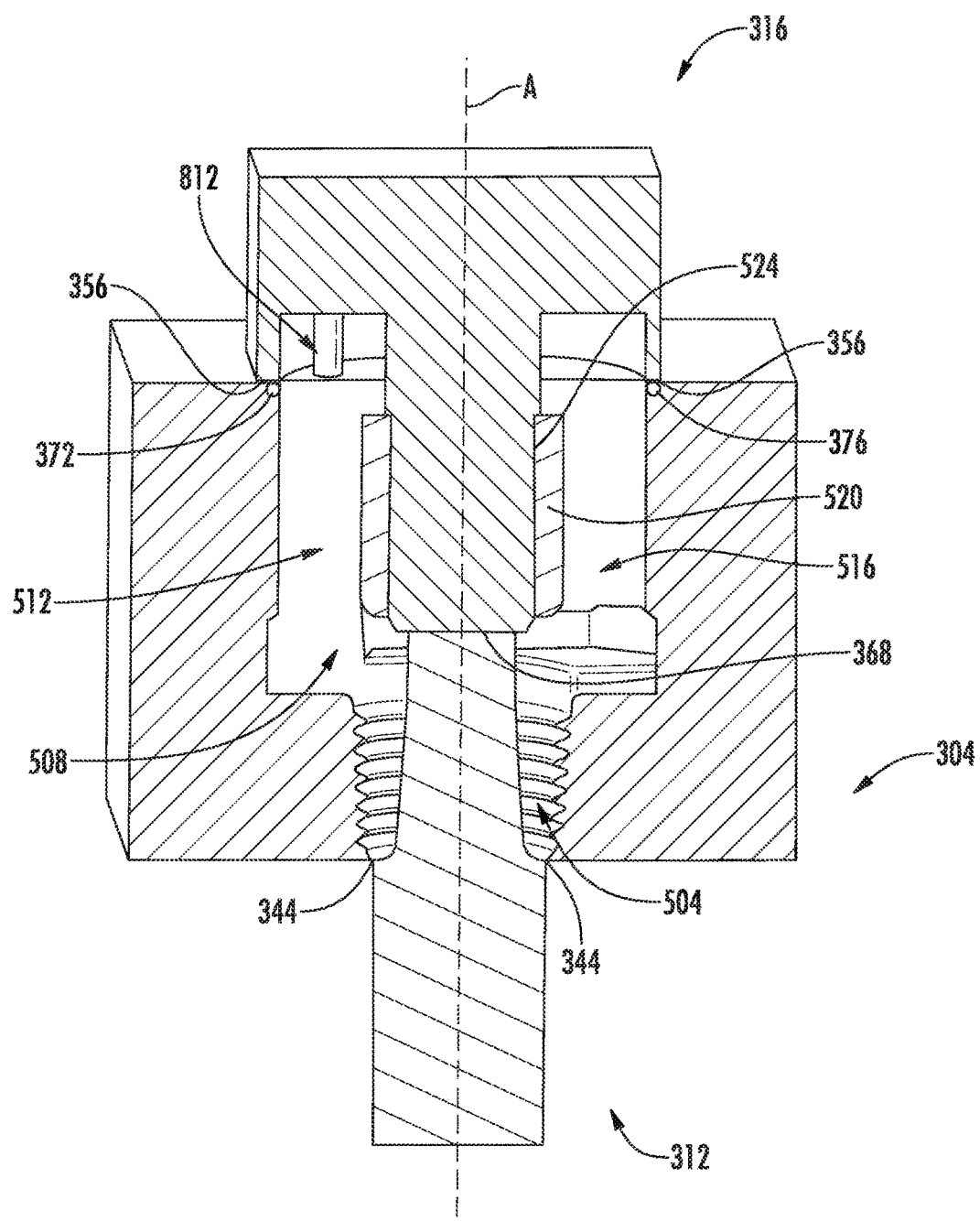
FIG. 4 illustrates a cross-sectional view of the injection mold of FIG. 3 taken along the lines 4-4.

FIGS. 3-4 illustrate the mold 300 in the use configuration in which the mold portions 304-316 are oriented to form the sprinkler head part 100. FIG. 4 illustrates a cross-section of the mold 300 taken along lines 4-4 of FIG. 3. In the use configuration, a surface of the first mold portion 304 abuts a surface of the second mold portion 308 at a first parting line 328. As used herein, the phrase "parting line" refers to a line or a plane at which two or more mold portions meet. A surface of the first mold portion 304 and a surface of the second mold portion 308 abut a surface of the third mold portion 312 at a second parting line 344. A surface of the first mold portion 304 and a surface of the second mold portion 308 abut a surface of the fourth mold portion 316 at a third parting line 356. A surface of the third mold portion 312 abuts a surface of the fourth mold portion 316 at a fourth parting line 368 (FIG. 4).

The mold 300 includes a first gate 372 and a second gate 376. The first gate 372 and the second gate 376 are structured to receive molten composite material and guide the molten composite material into the mold 300, as is described with regard to FIGS. 10 and 11. The first gate 372 and the second gate 376 have a substantially symmetric orientation relative to the axis A (FIG. 4). The first gate 372 and the second gate 376 are oriented relative to the portions of the mold 300 that form the frame arms 120, 124 so that the molten composite material flows into the mold 300 so that the reinforcing fibers of the composite material throughout the first and second frame arms 120, 124 are oriented substantially parallel to the axis A. The first gate 372 and the second gate 376 are positioned in a horizontal plane substantially perpendicular to the axis A. In the embodiment illustrated in FIGS. 3 and 4, the gates 372, 376 are positioned proximate intersections of the first parting line 328 and the third parting line 356 and are structured to introduce molten composite material into the mold 300 at or near the first and second frame arm/cross member junctions 176, 180. In another embodiment, the gates 372, 376 may be positioned proximate the first parting line 328 and generally aligned with the centers of the opposing wrench engagement surfaces 168. In such an embodiment, the gates 372, 376 are structured to introduce molten composite material into the mold 300 at or near the first and second frame arm/planar portion junctions 170, 172.

Figure 5:
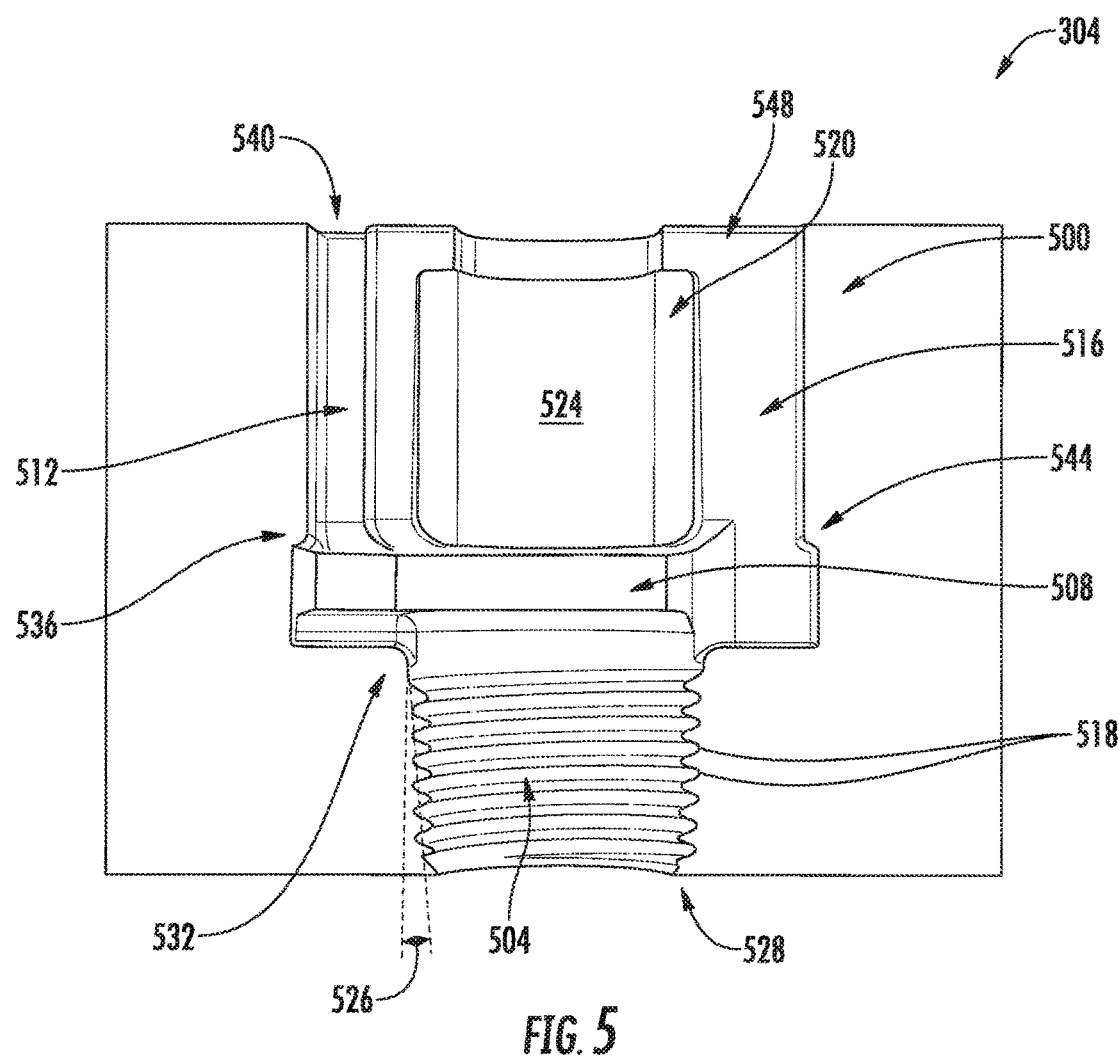
FIG. 5 illustrates a side view of a first portion of the mold of FIG. 3 according to an exemplary embodiment.
Figure 6:
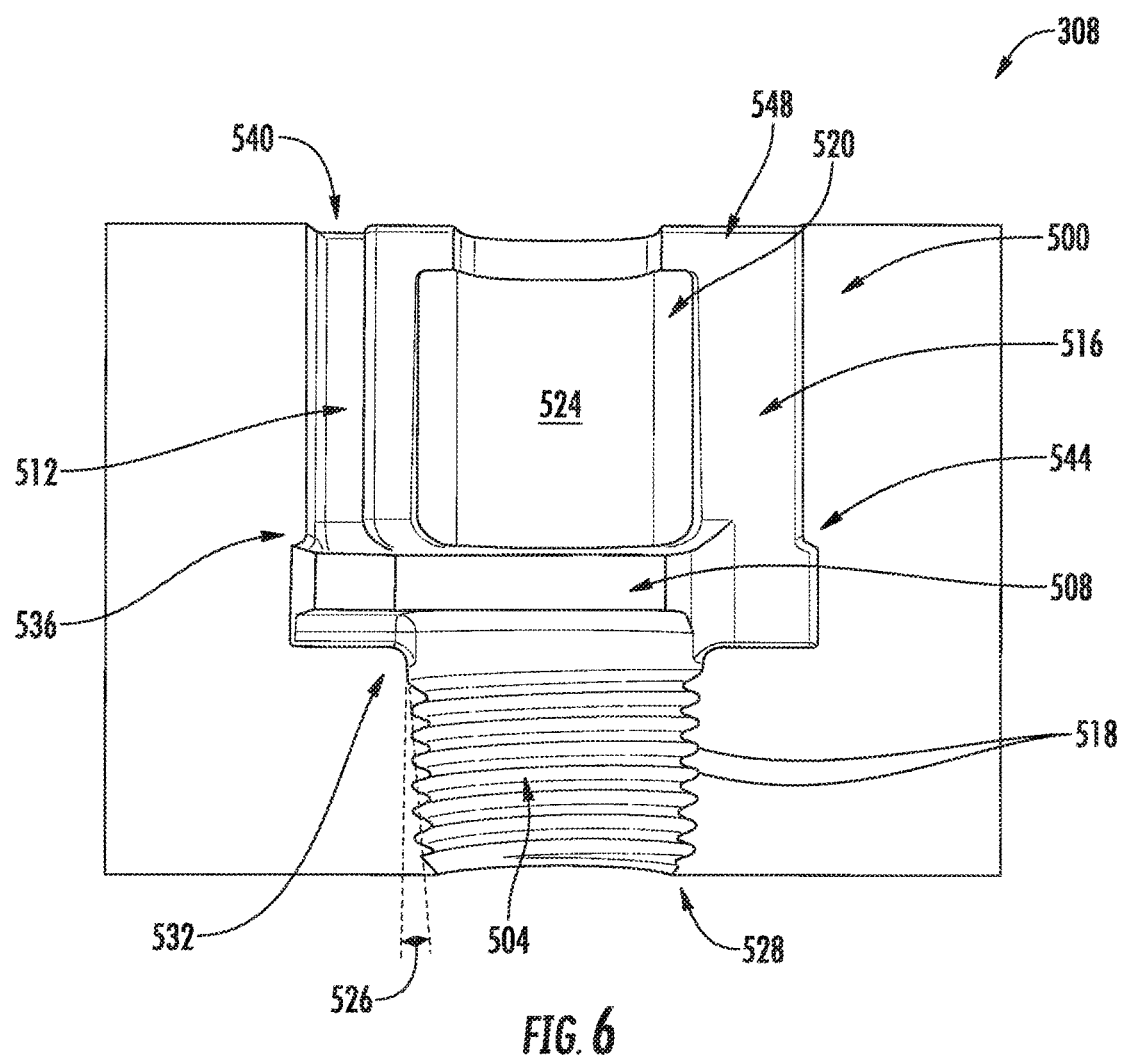
FIG. 6 illustrates a side view of a second portion of the mold of FIG. 3 according to an exemplary embodiment.

The first mold portion 304 and the second mold portion 308 are substantially similar and are shown in FIGS. 5 and 6. Accordingly, only the first mold portion 304 is described in detail herein. Corresponding parts between the first and second mold portions 304, 308 are shown using the same numbers. Turning now to FIG. 5, the first shaping element 500 includes a portion 504 structured to form the substantially cylindrical portion 132 of the body 116 of the sprinkler head part 100 (FIG. 1), a portion 508 structured to form the substantially planar portion 136 of the body 116, a portion 512 structured to form the first frame arm 120, a portion 516 structured to form the second frame arm 124, and a wall 520 structured to form a passageway 524 structured to receive the fourth mold portion 316.

The portion 504 includes a plurality of shaping elements 518 structured to form the threads 148 (FIG. 1) along at least a portion of the exterior surface 144 of the cylindrical portion 132 (FIG. 1). In some embodiments, the portion 504 has a draft angle 526 so that a proximal end 528 of the portion 504 has a diameter that is smaller than a distal end 532 of the portion 504. In some embodiments, the draft angle 526 may be zero or in some instances about 0.5 degrees.

With continued reference to FIG. 5, the portion 508 (structured to form the substantially planar portion 136 (FIG. 1) of the body 116) is substantially perpendicular to the portion 512 (structured to form the first frame arm 120) and the portion 516 (structured to form the second frame arm 124). The portion 512 is parallel to the portion 516. The portion 508 is structured to direct the molten composite material to flow along the directions indicated by the arrows X and Z of the coordinate system shown in FIG. 5, which orients the reinforcing fibers in the composite material in a direction that is substantially perpendicular to the direction indicated by the arrow Y of the coordinate system shown in FIG. 5.

The portion 512, which is structured to form the first frame arm 120 (FIG. 1), includes a proximal end 536 and a distal end 540. The proximal end 536 is open to the portion 508 and is structured to form the first frame arm/planar portion junction 170 (FIG. 1). The distal end 540 is open to an exterior of the first mold portion 304. The distal end 540 is structured to align with a portion of a groove formed in the fourth mold portion 316 when the mold 300 is in the use configuration, as shown in FIG. 4. Returning to FIG. 5, the distal end 540 and the groove of the fourth mold portion 316 are structured to form the first frame arm/cross member junction 176. The portion 512 is structured to direct the molten composite material to flow along the direction indicated by the arrow Y, which orients the reinforcing fibers in the composite material in a direction that is substantially parallel to the direction indicated by the arrow Y and substantially perpendicular to the directions indicated by the arrows X and Z.

The portion 516, which is structured to form the first frame arm 120 (FIG. 1), includes a proximal end 544 and a distal end 548. The proximal end 544 is open to the portion 508 and is structured to form the second frame arm/planar portion junction 172 (FIG. 1). The distal end 548 is open to an exterior of the first mold portion 304. The distal end 548 is structured to align with a portion of a groove formed in the fourth mold portion 316 when the mold 300 is in the use configuration, as shown in FIG. 4. The distal end 548 and the groove of the fourth mold portion 316 are structured to form the second frame arm/cross member junction 180 (FIG. 1). The portion 516 is structured to direct the molten composite material to flow along the direction indicated by the arrow Y, which orients the reinforcing fibers in the composite material in a direction that is substantially parallel to the direction indicated by the arrow Y and substantially perpendicular to the directions indicated by the arrows X and Z.

Figure 7:
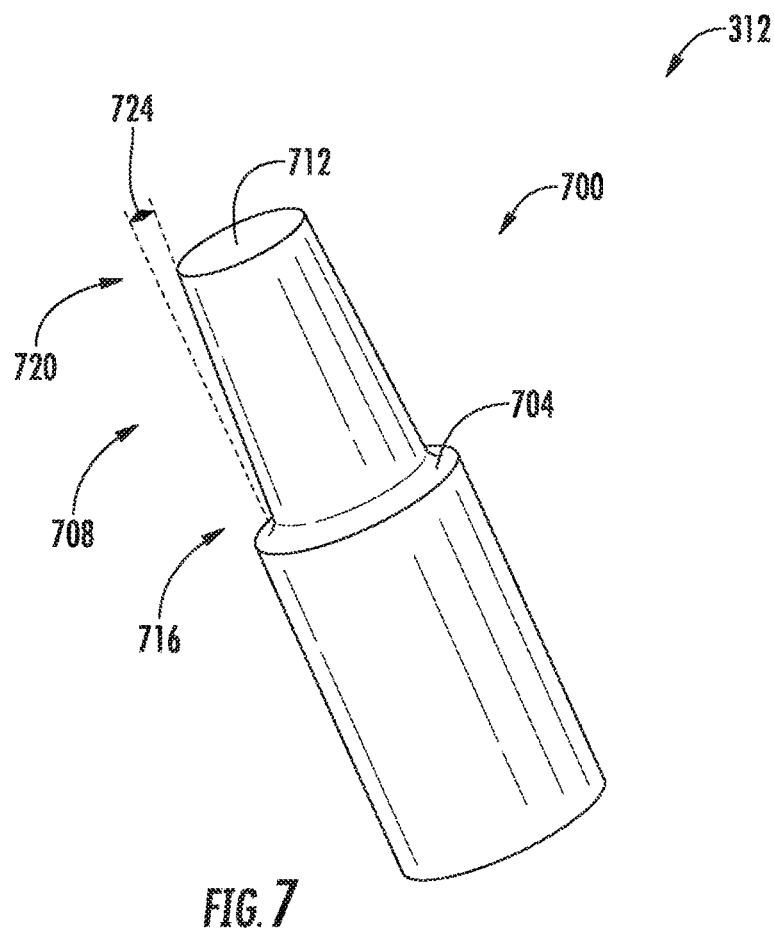
FIG. 7 illustrates a perspective view of a third portion of the mold of FIG. 3 according to an exemplary embodiment.

As shown in FIG. 4, the third mold portion 312 is structured to cooperate with the first mold portion 304, the second mold portion 308, and the fourth mold portion 316 to form the orifice 140. Referring now to FIG. 7, the third mold portion 312 includes a shaping element 700 structured to cooperate with the shaping elements 500 of the first and second mold portions 304 and a surface of the fourth mold portion 316 to form the orifice 140 in the cylindrical portion 132 of the body 116. The shaping element 700 includes a portion 704 structured to form a proximal end of the sprinkler head part 100, a portion 708 structured to form the orifice 140, and a substantially planar surface 712. As illustrated in FIG. 4, the substantially planar surface 712 is structured to engage the fourth mold portion 316 to form the orifice 140.

Typically, the portion 708 is tapered so that a proximal end 716 of the portion 708 has a diameter that is wider than a diameter of a distal end 720 of the portion 708. The portion 708 has a bank angle 724. In some embodiments, the bank angle 724 may be from about 0.5 degrees to about 16 degrees. Typically, the bank angle 724 may be from about 2 degrees to about 10 degrees. In some instances, the taper angle 916 is about 5 to about 10 degrees. In some embodiments, the portion 508 is substantially cylindrical and the bank angle 724 is about zero or in some instances about 0.5 degrees.

As shown in FIG. 4, the fourth mold portion 316 is structured to cooperate with the first and second mold portions 304, 308 to form the cross member 128. The fourth mold portion 316 is also structured to cooperate with the first mold portion 304, the second mold portion 308, and the third mold portion 312 to form the orifice 140, the sealing surface 160, the groove 162, and the beveled surface 164 of the sprinkler head part 100.

Figure 8:
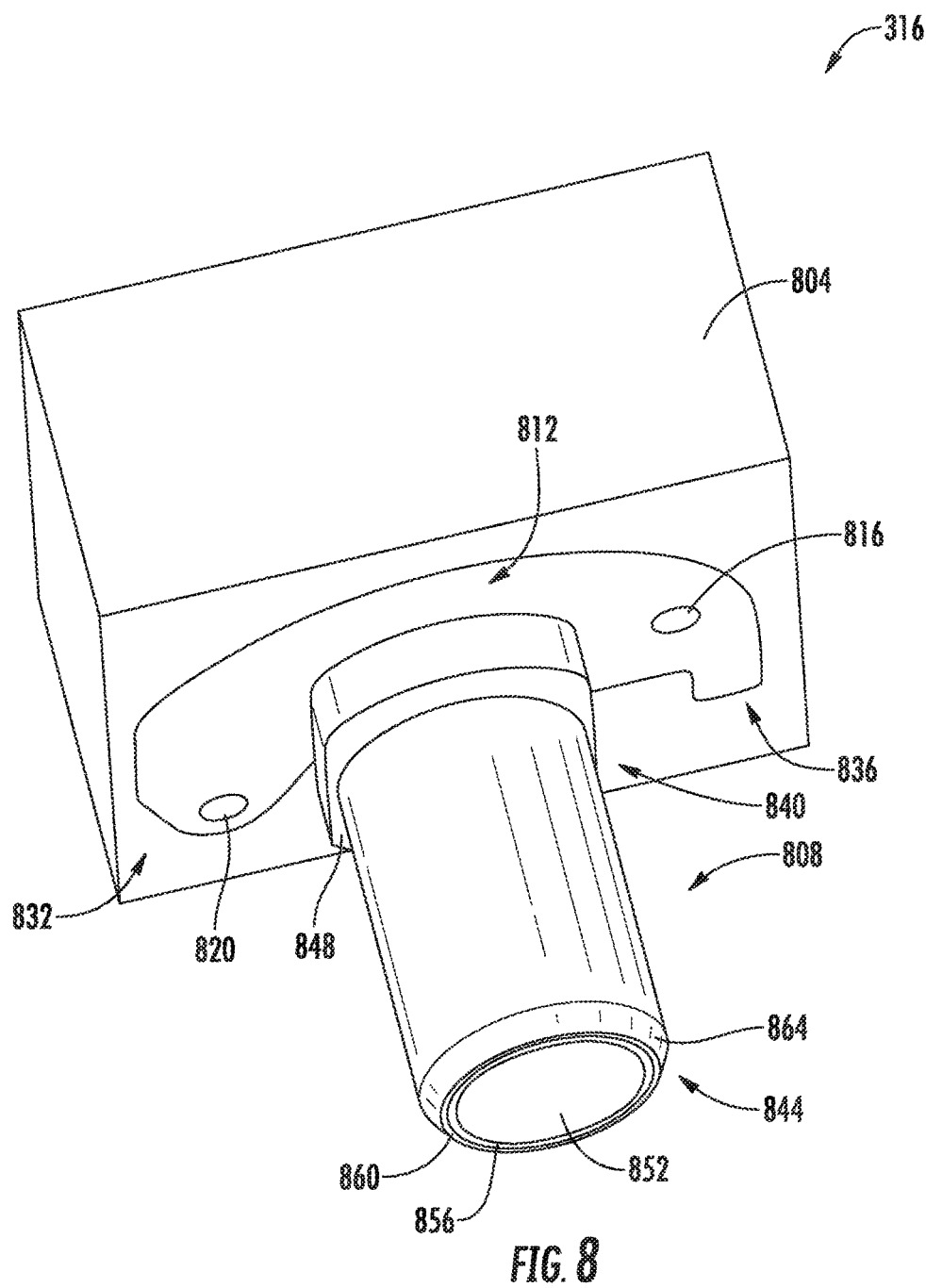
FIG. 8 illustrates a perspective view of a fourth portion of the mold of FIG. 3 according to an exemplary embodiment.
Figure 9:
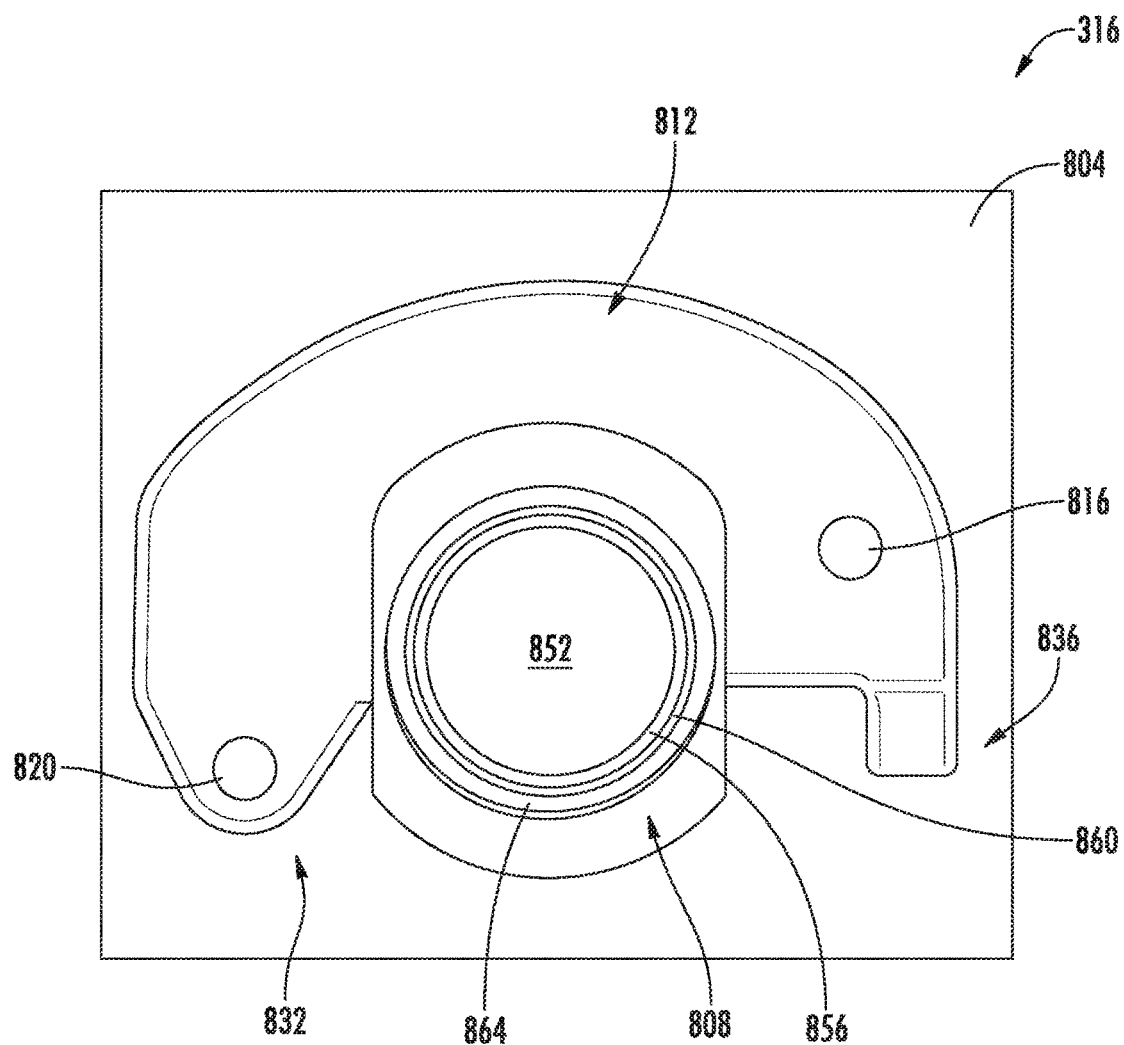
FIG. 9 illustrates a bottom view of the fourth portion of the mold of FIG. 8 according to an exemplary embodiment.

Referring now to FIGS. 8-9, the fourth mold portion 316 includes a first shaping element 804 and a second element 808. The first shaping element 804 is structured to form the cross member 128. A distal end 840 of the second shaping element 808 extends from the first shaping element 804. A proximal end 844 of the second shaping element 808 is structured to cooperate with the first mold portion 304, the second mold portion 308, and the third mold portion 312 to form the orifice 140, the sealing surface 160, the groove 162, and the beveled surface 164.

FIG. 9 illustrates a bottom view of the first shaping element 804 of the fourth mold portion 316. The first shaping element 804 is structured to form the cross member 128. The first shaping element 804 includes a groove 812, a first pin 816, and a second pin 820. In the illustrated embodiment, the groove 812 is substantially arcuate. In other embodiments, the groove 812 may be a different shape, such as annular. An end 832 of the groove 812 is structured to form the protrusion 192 that extends beyond the second frame arm 124. The first pin 816 and the second pin 820 are positioned within the groove 812. The first pin 816 is structured to form the first guide pin hole 184. The second pin 820 is structured to form the second guide pin hole 188. In some embodiments, the guide pins 816, 820 are circular, as shown in FIG. 1. In other embodiments, the guide pins 816, 820 may have other shapes, such as the bean-like shape shown in FIGS. 9 and 10. The walls of the first shaping element 804 that form the groove 812 and pins 816, 820 may have bank angles of about +/−0.5° to facilitate unmolding of the molded product.

When the mold 300 is in the use configuration, the groove 812 abuts a portion of the first mold portion 304 and the second mold portion 308 that are adjacent the fourth mold portion 316. As illustrated in FIG. 4, a first end 836 of the groove 812 overlies the open ends 540 of the first and second mold portions 304, 308 and forms the first frame arm/cross member junction 176. A portion of the groove 812 near but spaced from the end 832 and the second pin 820 overlies the open ends 548 of the first and second mold portions 304, 308 and forms the second frame arm/cross member junction 180.

Referring again to FIGS. 8-9, the second shaping element 808 includes a distal end 840 and a proximal end 844. The distal end 840 extends from the first shaping element 804. A seat 848 is proximate the distal end 840 and is structured to abut a distal end of the wall 520 (FIG. 5) when the mold 300 is in the use configuration. The proximal end 844 includes a substantially planar surface 852, a portion 856 structured to form the sealing surface 160 surrounding the orifice 140 (FIG. 1), a portion 860 structured to form the groove 162 (FIG. 1), and a portion 864 structured to form the beveled surface 164 (FIG. 1). The substantially planar surface 852 is structured to contact the surface 712 (FIG. 7) of the third mold portion 312 to form the orifice 140 (FIG. 1). The portions 856, 860 surround a perimeter of the substantially planar surface 852 and are structured to form the sealing surface 160 and the groove 162, respectively, around the orifice 140 (FIG. 1). The portion 864 surrounds the portion 856 and is structured to form the beveled surface 164 surrounding the sealing surface 160 (FIG. 1).

FIG. 4 illustrates the second shaping element 808 extending thorough the passageway 524 formed between the walls 520 of the first and second mold portions 304, 308 when the mold 300 is in the use configuration. The seat 848 abuts a distal end of the wall 520. The proximal end 844 extends beyond a proximal end of the wall 520 and contacts the surface 712 of the third mold portion 312.

In some embodiments, the third mold portion 312 and the fourth mold portion 316 may be combined into a single mold portion. In such an embodiment, the shaping element 700 extends from the proximal end 844 of the second shaping element 808 of the fourth mold portion 316. In such an embodiment, the bank angle 724 of the shaping element 700 may be about zero or in some instances about 0.5 degrees.

Figure 10A:
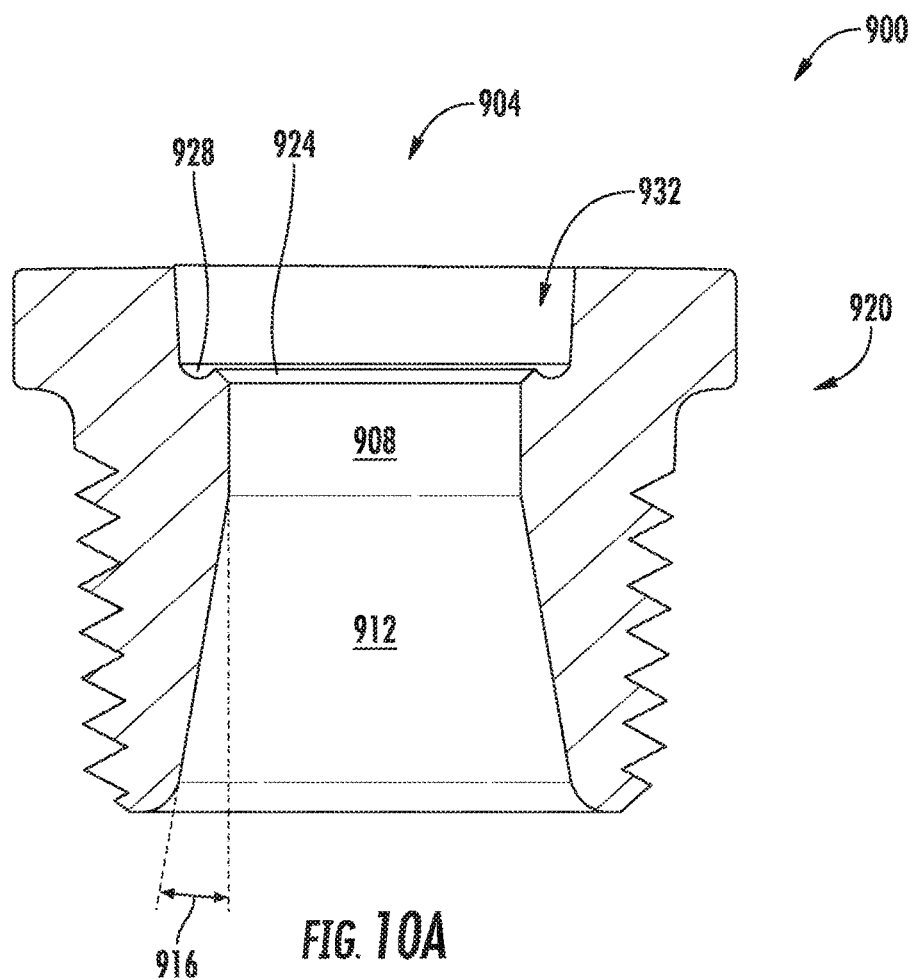
FIG. 10A illustrates a portion of a polymeric sprinkler head according to another exemplary embodiment.

FIG. 10A illustrates a substantially cylindrical portion 900 according to an alternate embodiment. The substantially cylindrical portion 900 is substantially similar to the substantially cylindrical portion 132 and is only described herein as it differs from the substantially cylindrical portion 132. The substantially cylindrical portion 900 includes an orifice 904. The orifice 904 includes a first substantially cylindrical portion 908 and a substantially tapered portion 912. The substantially tapered portion has a taper angle 916 of from about 0.5 degrees to about 16 degrees. Typically, the taper angle 916 is from about 2 degrees to about 10 degrees. In some instances, the taper angle 916 is about 5 to about 10 degrees. A distal end 920 of the orifice 904 includes a beveled surface 924, a sealing surface 928, and second substantially cylindrical portion 932. The beveled surface 924 is substantially similar to the beveled surface 164. The sealing surface 928 surrounds the first substantially cylindrical portion 908 and is structured to form a seat of a thermally-actuated valve (not shown). In the illustrated embodiment, the sealing surface 928 is curved. In other embodiments, the sealing surface 928 may be substantially planar. The substantially second cylindrical portion 932 is distal to the sealing surface 928 and has a diameter wider than a diameter of the first substantially cylindrical portion 908.

Figure 10B:
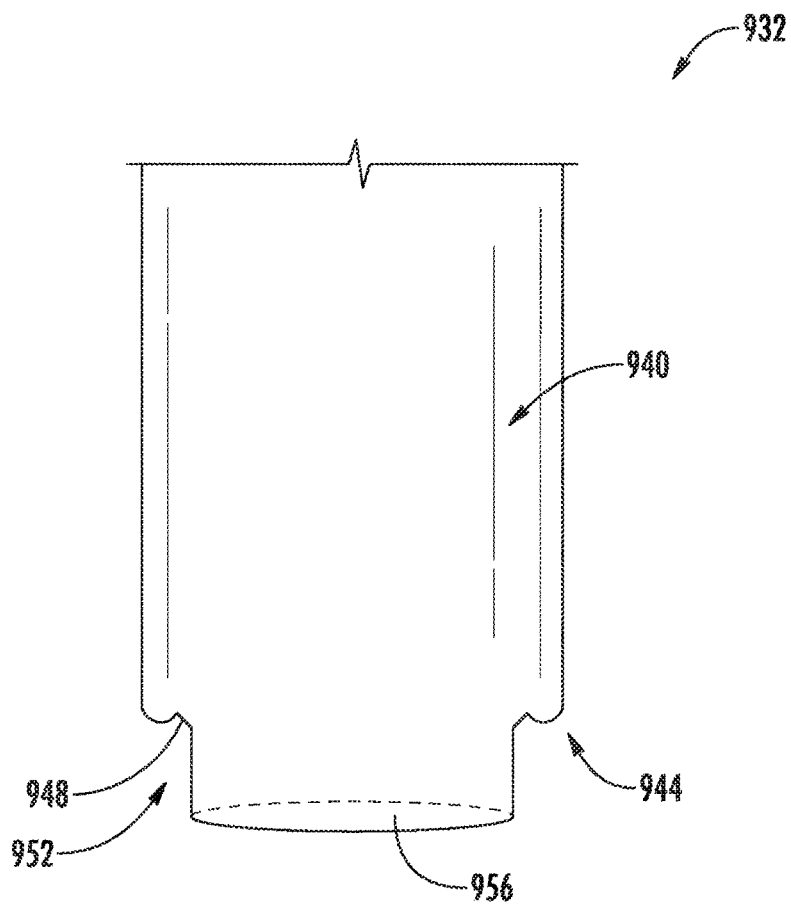
FIG. 10B illustrates a perspective view of a portion of an injection mold structured to form the portion of the polymeric sprinkler head illustrated in FIG. 10A according to an exemplary embodiment.

A sprinkler head part including the substantially cylindrical portion 900 may be made by a mold similar to the mold 300. Such a mold may include a first mold portion substantially similar to the first mold portion 304, a second mold portion substantially similar to the second mold portion 308, a third mold portion substantially similar to the third mold portion 312, and a fourth mold portion 932. The third mold portion is structured to form the tapered portion 912 of the orifice 904 as described above with respect to the third mold portion 312. The fourth mold portion 932 is illustrated in FIG. 10B. The fourth mold portion 932 is substantially similar to the fourth mold portion 316 and is only shown and described as it differs from the fourth mold portion 316. Corresponding parts between the fourth mold portion 932 and the fourth mold portion 316 have similar names.

As illustrated in FIG. 10B, the fourth mold portion 932 includes a second shaping element 940. The second shaping element 940 includes a portion 944 structured to form the sealing surface 928 (FIG. 10A), a portion 948 structured to form the beveled surface 924 (FIG. 10A), a portion 952 structured to form the first cylindrical portion 908 (FIG. 10A), and a substantially planar portion 956. The substantially planar portion 956 is structured to abut the substantially planar surface 712 (FIG. 7) of the third mold portion 312 (FIG. 4) in the use portion to form the orifice 904 (FIG. 10A). The walls of the second shaping element 940 that form the first cylindrical portion 908 (FIG. 10A) and the second cylindrical portion 932 may have bank angles of about +/−0.5° to facilitate unmolding of the molded product. In some embodiments, the portion 952 may be formed on the substantially planar surface 712 (FIG. 7) of the third mold portion 312 (FIG. 4) instead of on the fourth mold portion 932.

Figure 11:
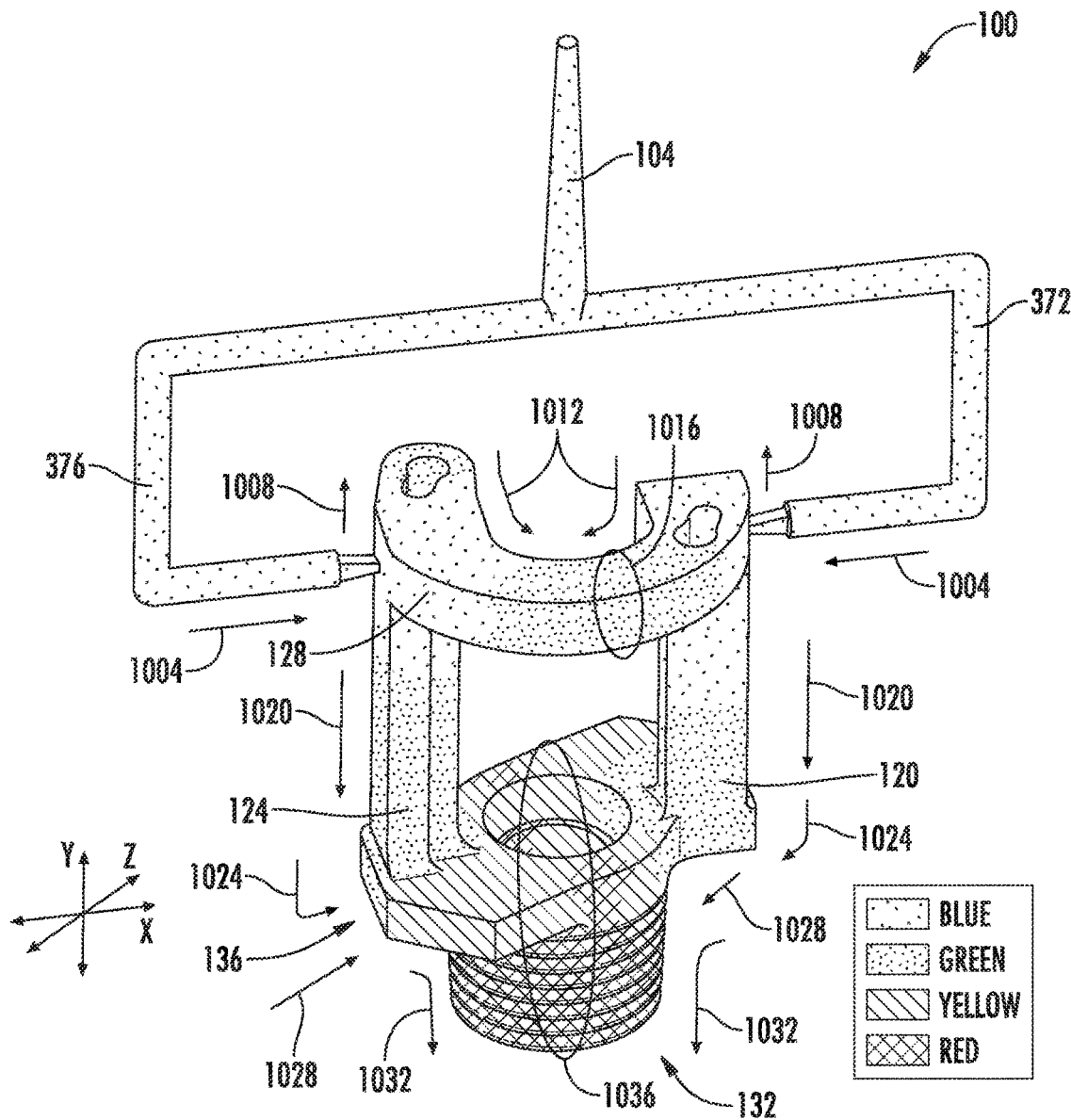
FIG. 11 illustrates a flow path of molten composite material through the mold of FIGS. 2 and 3 according to an exemplary embodiment.

FIG. 11 is a schematic representation of the molten composite material 104 flowing though the mold 300. While the elements of the mold 300 (FIGS. 3-4) are not shown in FIG. 11, the molten composite material 104 is shown entering the mold 300 through the first and second gates 372, 376 positioned proximate the intersecting points of the first parting line 328 (FIGS. 3-4) and the third parting line 356 (FIGS. 3-4). In some embodiments, the gates 372, 376 are structured to introduce molten composite material into the mold 300 at or near the first and second frame arm/cross member junctions 176, 180 (FIG. 1), respectively. In some embodiments, the gates 372, 376 are structured to introduce molten composite material into the mold 300 at or near an end of the first and second frame arms 120, 124 (FIGS. 1, 11), respectively. Thus, while the flow of the molten composite material is described with respect to the features of the sprinkler head part 100 (FIG. 1), it should be understood that the molten composite material is flowing through the shaping elements of the mold 300 (FIGS. 3-4) that are structured to form these features as described above. As illustrated in FIG. 11, the first and second gates 372, 376 are symmetrically oriented with respect to the sprinkler head part 100 (FIG. 1). The first gate 372 and the second gate 376 are positioned in a horizontal plane substantially perpendicular to the direction illustrated by the y-axis of the coordinate system illustrated in FIG. 11. Color is used to illustrate the flow of the composite material 104 over time, with blue (hottest molten material) illustrating molten composite material 104 that has been in the mold 300 for a short amount of time and red (coolest molten material) illustrating molten composite material 104 that has been in the mold 300 for the longest amount of time. The green and yellow colored portions represent zones of molten composite material 104 that has been in the mold 300 for intermediate amounts of time.

As illustrated by arrows 1004, the molten composite material 104 is injected into the mold 300 (FIGS. 3-4) in a direction that is substantially parallel to the direction illustrated by the x-axis in the coordinate system illustrated in FIG. 11. As indicated by arrows 1008, a portion of the molten composite material 104 flows in upward y-direction and into the cross member 128 (FIGS. 1, 11). As indicated by arrows 1012, the molten composite material 104 flows into the cross member 128, around the pins 824, 828 (FIGS. 8-9), and flows towards a center of the cross member 128. The flow of molten composite material 104 injected into the gate 372 meets the flow of molten composite material 104 injected into the gate 376 proximate the center the cross member 128, as illustrated by a region 1016. In some embodiments, the knit line is substantially centered in the cross member 128.

As indicated by arrows 1020, a portion of the flow of molten composite material 104 entering the mold 300 (FIGS. 3-4) via the gates 372, 376 flows in a downward y-direction and into the first and second frame arms 120, 124, respectively. As shown by the arrows 1020, the flow of the composite material through the frame arms 120, 124 is substantially parallel to the y-direction illustrated in the coordinate system of FIG. 11, which orients the reinforcing fibers 112 (FIG. 1) in the molten composite material 104 (FIGS. 1, 11) in a direction substantially parallel to the y-direction. As shown by arrows 1024, the molten composite material 104 then flows through the frame arm/planar portion junctions 170, 172 (FIG. 1) into the substantially planar portion 136 (FIGS. 1, 11). As shown by arrows 1028, the flow of the molten composite material 104 through the substantially planar portion 136 is substantially in the x- and z-directions (e.g., is substantially perpendicular to the y-direction). This orients the reinforcing fibers in the molten composite material 104 flowing through the substantially planar portion 136 in a direction that is substantially perpendicular to y-direction and substantially perpendicular to the orientation of the reinforcing fibers in the first and second frame arms 120, 124. As illustrated by arrows 1032, the molten composite material then flows into the substantially cylindrical portion 132 (FIG. 1). The flow of molten composite material injected into the gate 372 meets the flow of molten composite material 104 injected into the gate 376 proximate the centers of the planar portion 136 and the cylindrical portion 132 (FIG. 1), as illustrated by a region 1036. As illustrated in FIG. 11, there are no knit lines in the first frame arm 120, the second frame arm 124, the first frame arm/planar portion junction 170 (FIG. 1), and the second frame arm/planar portion junction 172 (FIG. 1).

Figure 12:
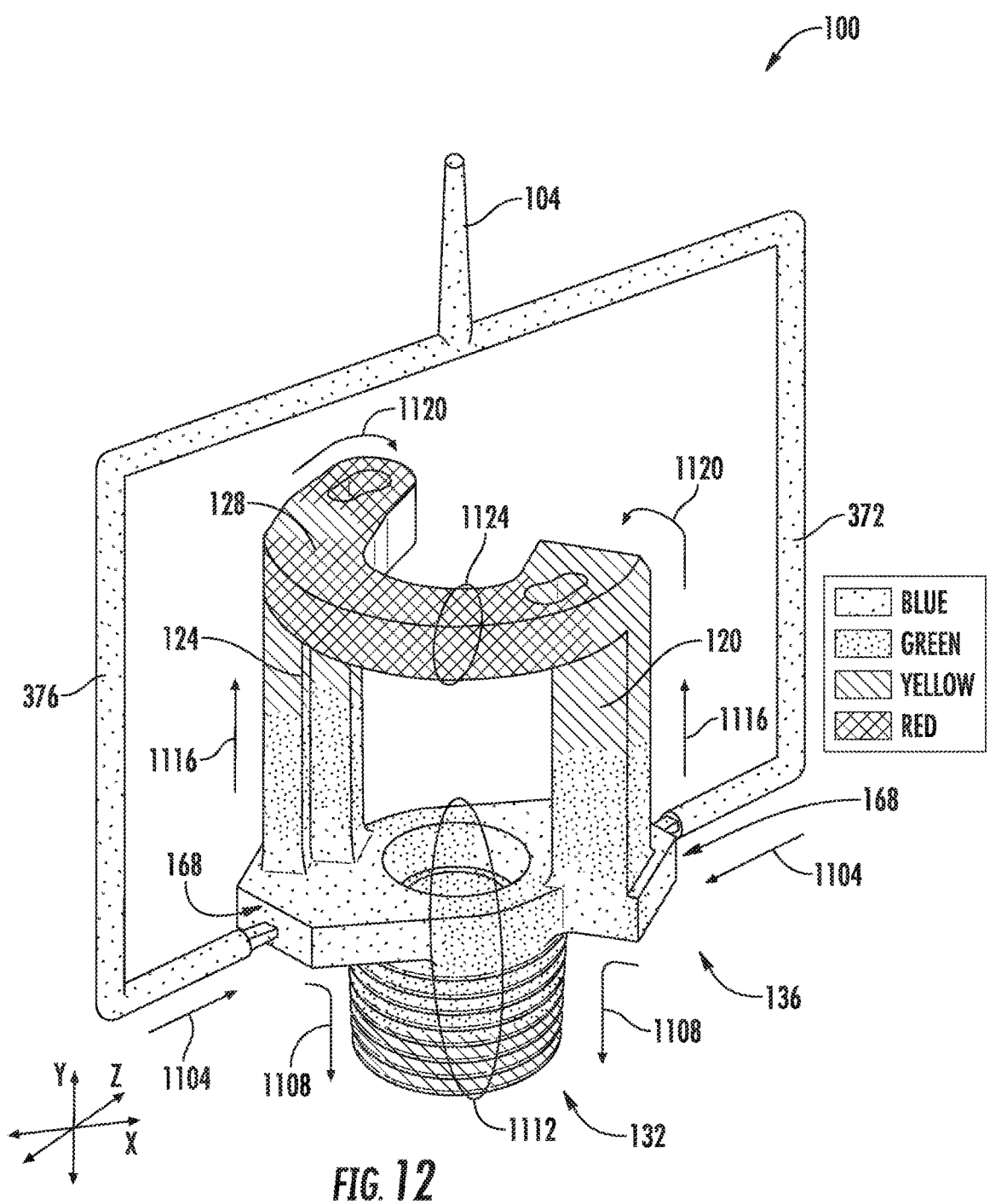
FIG. 12 illustrates another flow path of molten composite material through the mold of FIGS. 2 and 3 according to an exemplary embodiment.

FIG. 12 is a schematic representation of the molten composite material 104 flowing though the mold 300 (FIGS. 3-4) in another embodiment. While the elements of the mold 300 are not shown, the molten composite material 104 is shown entering the mold 300 through first and second gates 372, 376 positioned proximate the first parting line 328 (FIG. 3) and generally aligned with the centers of the opposing wrench engagement surfaces 168 (FIG. 1). In some embodiments, the gates 372, 376 are structured to introduce molten composite material 104 into the mold 300 at or near the first and second frame arm/planar portion junctions 170, 172 (FIG. 1), respectively. In some embodiments, the gates 372, 376 are structured to introduce molten composite material into the mold 300 at or near an end of the first and second frame arms 120, 124 (FIGS. 1, 12), respectively. Thus, while the flow of the molten composite material is described with respect to the features of the sprinkler head part 100 (FIG. 1), it should be understood that the molten composite material is flowing through the shaping elements of the mold 300 (FIGS. 3-4) that are structured to form these features as described above. As illustrated in FIG. 12, the first and second gates 372, 376 may advantageously be symmetrically oriented with respect to the sprinkler head part 100 (FIG. 1). The first gate 372 and the second gate 376 are positioned in a horizontal plane substantially perpendicular to the direction illustrated by the y-axis of the coordinate system illustrated in FIG. 12. Color is used to illustrate the flow of the composite material 104 over time, with blue (hottest molten material) illustrating molten composite material 104 that has been in the mold 300 (FIGS. 3-4) for a short amount of time and red (coolest molten material) illustrating molten composite material 104 that has been in the mold 300 for a long amount of time. The green and yellow colored portions represent zones of molten composite material 104 that has been in the mold 300 for intermediate amounts of time. The molten composite material 104 is typically introduced into the mold such that the molten material is simultaneously flows through both gates at a substantially identical rate.

As illustrated by arrows 1104, the molten composite material 104 is injected into the mold 300 (FIGS. 3-4) in a direction that is substantially parallel to the direction illustrated by the x- and z-axes in the coordinate system illustrated in FIG. 12. A portion of the molten composite material 104 flows through the substantially planar portion 136 in the direction indicated by the arrows 1104. The flow of the molten composite material 104 through the planar portion 136 orients the reinforcing fibers in the molten composite material 104 in a direction that is substantially perpendicular to the y-axis of the coordinate system illustrated in FIG. 12. As indicated by arrows 1108, the molten composite material 104 then flows into the substantially cylindrical portion 132. The flow of molten composite material 104 injected into the gate 372 meets the flow of molten composite material 104 injected into the gate 376 proximate centers of the substantially planar portion 136 and the substantially cylindrical portion 132 as illustrated by a region 1112.

As illustrated by arrows 1116, a portion of the molten composite material 104 flows through the frame arm/planar portion junctions 170, 172 (FIG. 1) and into the frame arms 120, 124, respectively. As indicated by the arrows 1116, the molten composite material 104 flows through the frame arms 120, 124 in a direction that is substantially parallel to the direction indicated by the y-axis in the coordinate system shown in FIG. 12, which causes the reinforcing fibers 112 (FIG. 1) in the molten composite material 104 (FIGS. 11, 12) to be oriented substantially parallel to the direction indicated by the y-axis. As indicated by arrows 1120, the molten composite material 104 flow into the cross member 128, around the pins 824, 828 (FIGS. 8-9), and flows towards a center of the cross member 128. The flow of molten composite material 104 injected into the gate 372 meets the flow of molten composite material 104 injected into the gate 376 proximate the center of the cross member 128, as illustrated by a region 1124. In some embodiments, the knit line is substantially centered in the cross member 128. As illustrated in FIG. 12, there are no knit lines in the first frame arm 120, the second frame arm 124, the first frame arm/planar portion junction 170 (FIG. 1), and the second frame arm/planar portion junction 172 (FIG. 1).

Method of Molding

Figure 13:
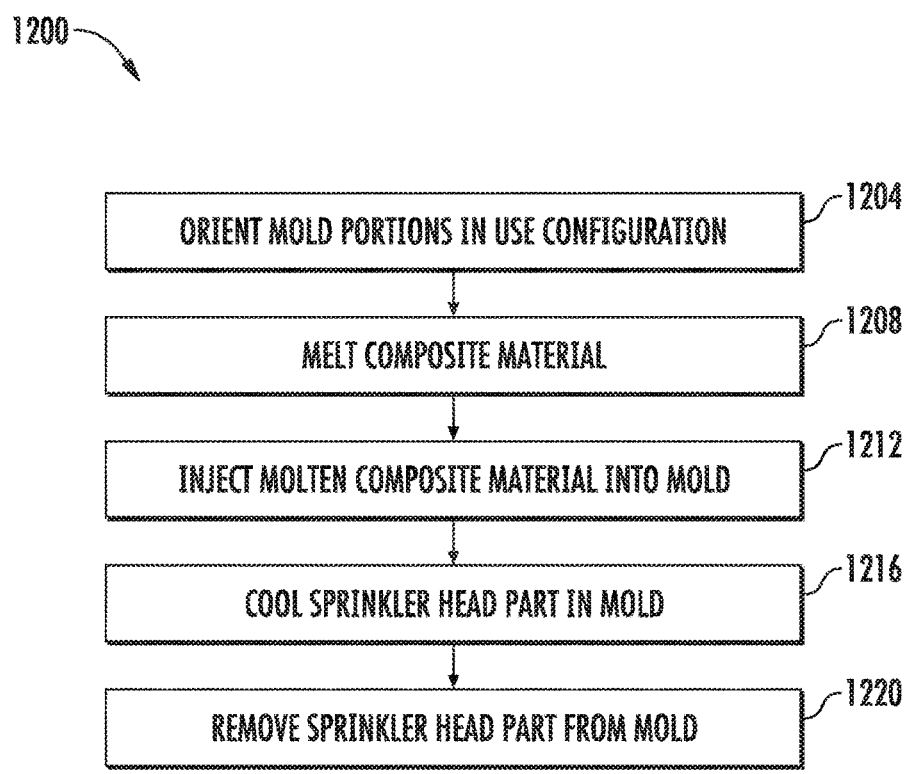
FIG. 13 is a flow diagram of a method for molding the sprinkler head part of FIG. 1 according to an exemplary embodiment.

FIG. 13 illustrates a flow diagram of an exemplary process 1200 for manufacturing a molded product, such as the sprinkler head part 100 (FIG. 1) via injection molding. At process 1204, the mold portions 304-316 are oriented in the use configuration shown in FIGS. 3-4. At process 1208, the thermoplastic polymer resin in the composite material is melted to form molten composite material. The composite material can be any of the exemplary composite materials described below.

At process 1212, the molten composite material is injected into the mold 300 (FIGS. 3, 4). The molten composite material is injected into the mold 300 via the first gate 372 (FIGS. 10, 11) and the second gate 376 (FIGS. 10, 11). The molten composite material flows through the mold 300 as described with respect to FIG. 11 or FIG. 12. Injection of the molten composite material into the mold 300 (FIGS. 3, 4) is controlled to provide a molded product in which a reinforcement fiber orientation is predominately in a direction parallel to an axial direction of the first and second frame arms 120, 124 (FIGS. 1, 11, 12). Injection of the molten composite material into the mold 300 is controlled to provide the welded product with a knit line located proximate a center of the cross member 128 (FIGS. 1, 11, 12). The controlled injection of molten composite material commonly also provides knit lines on a portion of the planar portion 136 and/or cylindrical portion 132 (FIGS. 1, 11, 12) that located away from the frame arm/planar portion junctions 170, 172 (FIG. 1). Injection of the molten composite material may advantageously be controlled so that the sprinkler head part 100 does not include any knit lines in the first frame arm 120, the second frame arm 124 (FIGS. 1, 11, 12), the first frame arm/planar portion junction 170, the second frame arm/planar portion junction 172, the first frame arm/cross member junction 176 or the second frame arm/cross member junction 180 (FIG. 1).

At process 1216, the molten composite material is allowed to cool in the mold, forming the sprinkler head part 100 (FIG. 1). As the molten composite material cools, the molten composite material shrinks to a small degree as described in the Exemplary Materials section below. This shrinkage facilitates unmolding. During cooling, the cross member 128 maintains an orientation of the frame arms 120, 124 such that the frame arm axes B, C (FIG. 2) remain parallel to the axis A (FIG. 2). Referring to FIG. 1, the cross member 128 maintains a relative orientation of the guide pin holes 184, 188 and the axis A during cooling so that an intersection of the axis A and the line D connecting the centers of the guide pin holes 184, 188 remains at the midpoint 190 of the line D. The molten composite material remains in the mold at least until the composite material has hardened.

At process 1220, the sprinkler head part 100 (FIG. 1) is removed from the mold 300 (FIGS. 3, 4). For example, with reference to FIG. 3, the first and second mold portions 304, 308 are moved away from each other in the direction indicated by the arrow E. The fourth mold portion 316 is lifted away from the third mold portion 312 in the direction indicated by the arrow F. The sprinkler head part 100 is then lifted off of the third mold portion 312. The shrinkage of the composite material that occurs during process 1216 facilitates removal of the sprinkler head part 100 from the mold portions 304-316. The sprinkler head part 100 including the features described above is formed in a single molding step. In contrast, conventional metal sprinkler head parts commonly require the guide pin holes to be machined into the sprinkler head part after the sprinkler head part has been molded.

Exemplary Materials

The composite material described herein includes a thermoplastic polymeric resin and a plurality of reinforcing fibers. Exemplary embodiments of the composite material are described with respect to the following standards: ASTM International Standards D3418, D570, E831, D638, D695 and International Organization for Standardization (ISO) Standards 294-24 and 2577, all of which are incorporated by reference herein in relevant part.

In an exemplary embodiment, the composite material includes a thermoplastic polymeric resin and a plurality of reinforcing fibers. The thermoplastic polymeric resin has a peak melting temperature of at least about 250° C. (as determined pursuant to ASTM D3418), a water absorption of no more than about 0.3 wt. % (as determined pursuant to ASTM D570), and a coefficient of thermal expansion of no more than about 100 microns/m (as determined pursuant to ASTM E831). The composite material may have an elongation at break of no more than about 3% (as determined pursuant to ASTM D638). The composite material may have a compressive strength of at least about 150 MPa (as determined pursuant to ASTM D695). The composite material may have a tensile strength of at least about 150 MPa, and, in some instances, may have a tensile strength of at least about 200 or at least about 250 MPa (as determined pursuant to ASTM D638). The composite material may have a transverse molding shrinkage of no more than about 1% (as determined pursuant to ISO 294-24, 2577). The composite material may have a melt flow index at 400° C. of at least about 1 g/10 min. Typically, the melt flow index may be at least about 10 g/10 min at 400° C. The thermoplastic polymeric resin may include polyphenylenesulfide, polyphthalamide, polyetheretherketone (PEEK), polyetherimide or a combination of two or more thereof. The reinforcing fibers may be glass fibers, carbon fibers, aramid fibers or a mixture of two or more thereof.

In another exemplary embodiment, the composite material includes a thermoplastic polymeric resin and a plurality of reinforcing fibers. The thermoplastic polymeric resin has a melting point of at least about 250° C., water absorption of no more than about 0.3 wt. % (as determined pursuant to ASTM D570), and the composite material has an elongation at break of no more than about 3% (as determined pursuant to ASTM D638). The composite material may have a coefficient of thermal expansion of no more than about 100 microns/m (as determined pursuant to ASTM E831). The composite material may have a compressive strength of at least about 150 MPa (as determined pursuant to ASTM D695). The composite material may have a tensile strength of at least about 150 MPa, and, in some instances, may have a tensile strength of at least about 200 or at least about 250 MPa (as determined pursuant to ASTM D638). The composite material may have a transverse molding shrinkage of no more than about 1% (as determined pursuant to ISO 294-24, 2577). The composite material may have a melt flow index at 400° C. of at least about 1 g/10 min. Typically, the composite material may have a melt flow index of at least about 10 g/10 min at 400° C.

In another exemplary embodiment, the composite material includes a thermoplastic polymeric resin and a plurality of reinforcing fibers. The thermoplastic polymeric resin has a melting point of at least about 250° C., water absorption of no more than about 0.3 wt. % (as determined pursuant to ASTM D570), and the composite material has a transverse molding shrinkage of no more than about 1% (as determined pursuant to ISO 294-24, 2577). The composite material may have an elongation at break of no more than about 3% (as determined pursuant to ASTM D638). The composite material may have a coefficient of thermal expansion of no more than about 100 microns/m (as determined pursuant to ASTM E831). The composite material may have a compressive strength of at least about 150 MPa (as determined pursuant to ASTM D695). The composite material may have a tensile strength of at least about 150 MPa, and, in some instances, may have a tensile strength of at least about 200 or at least about 250 MPa (as determined pursuant to ASTM D638). The composite material may have a transverse molding shrinkage of no more than about 1% (as determined pursuant to ISO 294-24, 2577). The composite material may have a melt flow index at 400° C. of at least about 1 g/10 min. Typically, the composite material may have a melt flow index of at least about 10 g/10 min at 400° C.

In another exemplary embodiment, the composite material includes a thermoplastic polymeric resin and a plurality of reinforcing fibers. The thermoplastic polymeric resin has a melting point of at least about 250° C., a water absorption of no more than about 0.3 wt. % (as determined pursuant to ASTM D570, and the composite material has a tensile strength of at least about 150 MPa (as determined pursuant to ASTM D638). In some instances, the composite material may have a tensile strength of at least about 200 or at least about 250 MPa. The composite material may have a compressive strength of at least about 150 MPa (as determined pursuant to ASTM D695). The composite material may have a coefficient of thermal expansion of no more than about 100 microns/m (as determined pursuant to ASTM E831). The composite material may have an elongation at break of no more than about 3% (as determined pursuant to ASTM D638). The composite material may have a transverse molding shrinkage of no more than about 1% (as determined pursuant to ISO 294-24, 2577). The composite material may have a melt flow index at 400° C. of at least about 1 g/10 min. Typically, the composite material may have a melt flow index of at least about 10 g/10 min at 400° C.

In another exemplary embodiment, the composite material includes a thermoplastic polymeric resin and a plurality of reinforcing fibers. The thermoplastic polymeric resin is selected from the group consisting of Polyphenylene Sulfide (PPS), Polyetheretherketone (PEEK), Polyetherketoneketone (PEKK), Polyphthalamide (PPA), Polyimide (TPI), Polyamide (PA), Polysulfone (PSU), Polyethersulfone (PES), Polyetherimide (PEI), Liquid Crystal Polymer (LCP) and mixtures of two or more thereof. The reinforcing fibers selected from the group consisting of glass fibers, carbon fibers, aramid fibers and mixtures of two or more thereof.

In some embodiments, the thermoplastic polymeric resin is PPS and the reinforcing fibers are glass fibers and/or carbon fibers. The composite material includes about 25 to 45 wt. % glass fibers. The thermoplastic polymeric resin may have a peak melting temperature of at least about 250° C. (as determined pursuant to ASTM D3418), and a water absorption of no more than about 0.1 wt. % (as determined pursuant to ASTM D570). The composite material may have a coefficient of thermal expansion of no more than about 100 microns/m (as determined pursuant to ASTM E831). The composite material may have an elongation at break of no more than about 2% (as determined pursuant to ASTM D638). The composite material may have a compressive strength of at least about 150 MPa (as determined pursuant to ASTM D695). The composite material may have a tensile strength of at least about 150 MPa (as determined pursuant to ASTM D638). The composite material may have a transverse molding shrinkage of no more than about 0.8% (as determined pursuant to ISO 294-24, 2577). The composite material may have a melt flow index at 400° C. of at least about 1 g/10 min. Typically, the composite material may have a melt flow index of at least about 10 g/10 min at 400° C.

In some embodiments, the thermoplastic polymeric resin is PEEK and the reinforcing fibers are glass and/or carbon fibers. The composite material includes about 25 to 35 wt. % glass fibers. The thermoplastic polymeric resin may have a peak melting temperature of at least about 325° C. (as determined pursuant to ASTM D3418), and a water absorption of no more than about 0.2 wt. % (as determined pursuant to ASTM D570). The composite material may have a coefficient of thermal expansion of no more than about 50 microns/m (as determined pursuant to ASTM E831). The composite material may have an elongation at break of no more than about 3% (as determined pursuant to ASTM D638). The composite material may have a compressive strength of at least about 150 MPa (as determined pursuant to ASTM D695). The composite material may have a tensile strength of at least about 15 MPa, and, in some instances, may have a tensile strength of at least about 200 (as determined pursuant to ASTM D638). The composite material may have a transverse molding shrinkage of no more than about 1.5% (as determined pursuant to ISO 294-24, 2577). The composite material may have a melt flow index at 400° C. of at least about 5 g/10 min. Typically, the composite material may have a melt flow index of at least about 10 g/10 min at 400° C.

In some embodiments, the thermoplastic polymeric resin is PEI and the reinforcing fibers are glass and/or carbon fibers. The composite material may include about 25 to 35 wt. % carbon fibers. The thermoplastic polymeric resin may have a glass transition temperature of at least about 200° C. (as determined pursuant to ASTM D3418) and a water absorption of no more than about 0.2 wt. % (as determined pursuant to ASTM D570). The composite material may have a coefficient of thermal expansion of no more than about 25 microns/m (as determined pursuant to ASTM E831). The composite material may have an elongation at break of no more than about 1.3% (as determined pursuant to ASTM D638). The composite material may have a compressive strength of at least about 200 MPa (as determined pursuant to ASTM D695). The composite material may have a tensile strength of at least about 250 MPa. The composite material may have a transverse molding shrinkage of no more than about 0.2% (as determined pursuant to ISO 294-24, 2577). The composite material may have a melt flow index at 380° C. of at least about 25 g/10 min. Typically, the composite material may have a melt flow index of at least about 50 g/10 min at 380° C.

In some embodiments, the thermoplastic polymeric resin is PPA and reinforcing fibers are glass and/or carbon fibers. The composite material may include about 20 to 35 wt. % glass fibers. The thermoplastic polymeric resin may have a peak melting temperature of at least about 300° C. (as determined pursuant to ASTM D3418) and a water absorption of no more than about 0.3 wt. % (as determined pursuant to ASTM D570). The composite material may have a coefficient of thermal expansion of no more than about 250 microns/m (as determined pursuant to ASTM E831). The composite material may have an elongation at break of no more than about 2.5% (as determined pursuant to ASTM D638). The composite material may have a compressive strength elongation at break of at least about 150 MPa (as determined pursuant to ASTM D696). The composite material may have a tensile strength of at least about 150 MPa, and, in some instances, may have a tensile strength of at least about 200 (as determined pursuant to ASTM D638). The composite material may have a transverse molding shrinkage of no more than about 1.2% (as determined pursuant to ISO 294-24, 2577). The composite material may have a melt flow index at 400° C. of at least about 1 g/10 min. Typically, the composite material may have a melt flow index of at least about 10 g/10 min at 400° C.

Illustrative Embodiments

Reference is made to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods, materials, and compositions described herein.

An exemplary injection mold for producing a sprinkler head part includes a first mold portion, a second mold portion, a third mold portion, and a fourth mold portion. The first and second mold portions include first and second shaping elements structured to cooperatively form a body including a substantially cylindrical portion and a substantially planar portion, a first frame arm extending from the substantially planar portion of the body, and a second frame arm extending from the substantially planar portion of the body. The third mold portion includes a third shaping element structured to form an orifice in the body of the sprinkler head. The fourth mold portion includes a fourth shaping element structured to form a cross member connecting the first frame arm and the second frame arm.

In some embodiments, the orifice of the injection mold has a distal end formed in the substantially planar portion and a proximal and spaced from the substantially planar portion. The fourth mold portion includes a fifth shaping element structured to cooperate with the third shaping element to form the orifice. An end of the third shaping element is structured to abut an end of the fifth shaping element to form a stepped surface surrounding the distal end of the orifice.

In some embodiments, the end of the fifth shaping element has a diameter that is wider than a diameter of the end of the third shaping element.

In some embodiments, the fifth shaping element is structured to form a beveled surface surrounding the distal end of the orifice. The beveled surface extends away from a center line of the orifice.

In some embodiments, the third shaping element includes a distal end structured to form the distal end of the orifice and a proximal end structured to form the proximal end of the orifice. The third shaping element tapers towards a center line of the orifice from the proximal end to the distal end.

In some embodiments, a draft angle of the third shaping element is from about two degrees to about 10 degrees.

In some embodiments, the fourth shaping element is structured to form a first hole and a second hole in the connecting element.

In some embodiments, the first hole and the second hole are oriented so that an orifice center line substantially bisects a line drawn between a center of the first hole and a center of the second hole.

In some embodiments, the connecting element is structured to maintain an orientation of the first hole and the second hole while a molding material injected into the injection mold cools.

In some embodiments, the connecting element is structured to maintain an orientation of the first and second frame arms while a molding material injected into the injection mold cools.

An exemplary method for producing a sprinkler head part includes injecting a composite material in molten form into a mold to form a molded product. The mold includes a first mold portion, a second mold portion, a third mold portion, and a fourth mold portion. The first and second mold portions include first and second shaping elements structured to cooperatively form a body, which comprises a substantially planar portion, a first frame arm extending from the substantially planar portion, the first frame arm defining a first frame arm axis, and a second frame arm extending from the substantially planar portion, the second frame arm defining a second frame arm axis. The third mold portion includes a third shaping element structured to form an orifice in the body which extends through the substantially planar portion. The fourth mold portion includes a fourth shaping element structured to form a cross member connecting the first frame arm and the second frame arm. Injecting the molten composite material is controlled to provide the molded product having a fiber orientation predominantly in a direction parallel to an axial direction of the first and second frame arms.

An exemplary method for producing a sprinkler head part includes injecting composite material in molten form into a mold to form a molded product. The mold includes a first mold portion, a second mold portion, a third mold portion, and a fourth mold portion. The first and second mold portions include first and second shaping elements structured to cooperatively form a body, which comprises a substantially planar portion, a first frame arm extending from the substantially planar portion at a first frame arm/planar portion junction and a second frame arm extending from the substantially planar portion at a second frame arm/planar portion junction. The third mold portion includes a third shaping element structured to form an orifice in the body of the sprinkler head. The fourth mold portion includes a fourth shaping element structured to from a cross member between the first frame arm at a first frame arm/cross member junction and the second frame arm at a second frame arm/cross member junction. Injecting the molten form of the polymeric composite material is controlled to provide the molded product without any knit lines in the any of the first and second frame arms, the first and second frame arm/cross member junctions, and the first and second frame arm/body junctions.

An exemplary method for producing a sprinkler head part includes injecting composite material in molten form into a mold to form a molded product. The mold includes a first mold portion, a second mold portion, a third mold portion, and a fourth mold portion. The first and second mold portions include first and second shaping elements structured to cooperatively form a body, which comprises a substantially planar portion, a first frame arm extending from the substantially planar portion at a first frame arm/planar portion junction and a second frame arm extending from the substantially planar portion at a second frame arm/planar portion junction. The third mold portion includes a third shaping element structured to form an orifice in the body. The orifice is oriented around an orifice center line centered therein. The fourth mold portion includes a fourth shaping element structured to form a cross member connecting the first frame arm and the second frame arm. The mold has two injection gates located in a substantially symmetrical orientation with respect to the orifice center line.

An exemplary method for producing a sprinkler head part includes injecting composite material in molten form into a mold to form a molded product. The mold includes a first mold portion, a second mold portion, a third mold portion, and a fourth mold portion. The first and second mold portions include first and second shaping elements structured to cooperatively form a body, which comprises a substantially planar portion, a first frame arm extending from the substantially planar portion at a first frame arm/planar portion junction and a second frame arm extending from the substantially planar portion at a second frame arm/planar portion junction. The third mold portion includes a third shaping element structured to form an orifice in the body. The orifice is oriented around an orifice center line centered therein. The fourth mold portion includes a fourth shaping element structured to form a cross member connecting the first frame arm and the second frame arm. The composite material includes thermoplastic polymer resin and reinforcing fibers dispersed therein. The first and second gates are located so that the molten composite material flows into the mold such that the reinforcing fibers throughout the first and second frame arms are oriented substantially parallel to the orifice center line.

An exemplary method for producing a sprinkler head part includes injecting composite material in molten form into a mold to form a molded product. The mold includes a first mold portion, a second mold portion, a third mold portion, and a fourth mold portion. The first and second mold portions include first and second shaping elements structured to cooperatively form a body, which comprises a substantially planar portion, a first frame arm extending from the substantially planar portion at a first frame arm/planar portion junction and a second frame arm extending from the substantially planar portion at a second frame arm/planar portion junction. The third mold portion includes a third shaping element structured to form an orifice in the body. The orifice is oriented around an orifice center line centered therein. The fourth mold portion includes a fourth shaping element structured to form a cross member connecting the first frame arm and the second frame arm. The first and second gates are located so that the molten composite material flows into the mold such that the molded product has a knit line substantially centered in the cross member.

An exemplary method for producing a sprinkler head part includes injecting composite material in molten form into a mold to form a molded product. The mold includes a first mold portion, a second mold portion, a third mold portion, and a fourth mold portion. The first and second mold portions include first and second shaping elements structured to cooperatively form a body, which comprises a substantially planar portion, a first frame arm extending from the substantially planar portion at a first frame arm/planar portion junction and a second frame arm extending from the substantially planar portion at a second frame arm/planar portion junction. The third mold portion includes a third shaping element structured to form an orifice in the body. The orifice is oriented around an orifice center line centered therein. The fourth mold portion includes a fourth shaping element structured to form a cross member connecting the first frame arm at a first frame arm/cross member junction and the second frame arm at a second frame arm/cross member junction. The mold has two injection gates located in a substantially symmetrical orientation with respect to the orifice center line and located in a horizontal plane perpendicular to the orifice center line.

An exemplary method for producing a sprinkler head part includes injecting composite material in molten form into a mold to form a molded product. The mold includes a first mold portion, a second mold portion, a third mold portion, and a fourth mold portion. The first and second mold portions include first and second shaping elements structured to cooperatively form a body, which comprises a substantially planar portion, a first frame arm extending from the substantially planar portion at a first frame arm/planar portion junction and a second frame arm extending from the substantially planar portion at a second frame arm/planar portion junction. The third mold portion includes a third shaping element structured to form an orifice in the body. The fourth mold portion includes a fourth shaping element structured to from a cross member between the first frame arm at a first frame arm/cross member junction and the second frame arm at a second frame arm/cross member junction. The mold has two injection gates each disposed at a frame arm/cross member junction or each disposed at a frame arm/planar portion junction.

An exemplary injection mold for producing a sprinkler head includes a first mold portion, a second mold portion, a third mold portion, and a fourth mold portion. The first and second mold portions include first and second shaping elements structured to cooperatively form a sprinkler head including a body includes a substantially cylindrical portion defining a central longitudinal axis and a substantially planar portion, a first frame arm extending from the substantially planar portion of the body, and a second frame arm extending from the substantially planar portion of the body. A first gate is positioned at or proximate an end at of the first frame arm. The first gate is structured to introduce a molten form of a polymeric composite material into the mold. A second gate is positioned at or proximate an end at of the second frame arm. The second gate is structured to introduce the molten form of the polymeric composite material into the mold. The polymeric composite material includes thermoplastic polymeric resin and a plurality of dispersed reinforcing fibers. The first and second gates are substantially symmetrically located with respect to the central longitudinal axis.

An exemplary injection mold for producing a sprinkler head includes a first mold portion, a second mold portion, a third mold portion, and a fourth mold portion. The first and second mold portions include first and second shaping elements structured to cooperatively form a sprinkler head including a body including a substantially cylindrical portion defining a central longitudinal axis and a substantially planar portion, a first frame arm extending from the substantially planar portion of the body, and a second frame arm extending from the substantially planar portion of the body. A first gate is positioned at or proximate an end at of the first frame arm. The first gate is structured to introduce a molten form of a polymeric composite material into the mold. A second gate is positioned at or proximate an end at of the second frame arm. The second gate is structured to introduce the molten form of the polymeric composite material into the mold. The polymeric composite material comprises thermoplastic polymeric resin and a plurality of dispersed reinforcing fibers. The first and second gates are located in a horizontal plane. The horizontal plane is perpendicular to the central longitudinal axis.

An exemplary injection mold for producing a sprinkler head includes a first mold portion, a second mold portion, a third mold portion, and a fourth mold portion. The first and second mold portions include first and second shaping elements structured to cooperatively form a sprinkler head including a body including a substantially cylindrical portion defining a central longitudinal axis and a substantially planar portion, a first frame arm extending from the substantially planar portion of the body, and a second frame arm extending from the substantially planar portion of the body. A first gate is positioned at or proximate an end at of the first frame arm. The first gate is structured to introduce a molten form of a polymeric composite material into the mold. A second gate is positioned at or proximate an end at of the second frame arm. The second gate is structured to introduce the molten form of the polymeric composite material into the mold. The polymeric composite material includes thermoplastic polymeric resin and a plurality of dispersed reinforcing fibers. The first and second gates are located so that the molten form of the polymeric composite material flows into the mold such that the reinforcing fibers throughout the first and second frame arms are oriented substantially parallel to the central longitudinal axis.

An exemplary injection mold for producing a sprinkler head includes a first mold portion, a second mold portion, a third mold portion, and a fourth mold portion. The first and second mold portions include first and second shaping elements structured to cooperatively form a sprinkler head including a body including a substantially cylindrical portion defining a central longitudinal axis and a substantially planar portion, a first frame arm extending from the substantially planar portion of the body, and a second frame arm extending from the substantially planar portion of the body. A first gate is positioned at or proximate an end at of the first frame arm. The first gate is structured to introduce a molten form of a polymeric composite material into the mold. A second gate is positioned at or proximate an end at of the second frame arm. The second gate is structured to introduce the molten form of the polymeric composite material into the mold. The polymeric composite material includes thermoplastic polymeric resin and a plurality of dispersed reinforcing fibers. The first and second gates are located so that the molten form of the polymeric composite material flows into the mold so as to not form any knit lines in the first or second frame arms.

While certain embodiments have been illustrated and described, it should be understood that changes and modifications can be made therein in accordance with ordinary skill in the art without departing from the technology in its broader aspects.

The embodiments illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expression of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "and" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Additionally, where features or aspects of the disclosure are described in terms of Markush groups, those skilled in the art will realize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof.

What is claimed is:

1. An injection mold for producing a sprinkler head part, the injection mold comprising:
    first and second mold portions including first and second shaping elements structured to cooperatively form a body including a substantially cylindrical portion and a substantially planar portion, a first frame arm extending from the substantially planar portion of the body, and a second frame arm extending from the substantially planar portion of the body;
    a third mold portion including a third shaping element structured to form an orifice in the body; and
    a fourth mold portion including a fourth shaping element structured to form a cross member connecting the first frame arm and the second frame arm.

2. The injection mold of claim 1, wherein the fourth mold portion includes a fifth shaping element structured to cooperate with the third shaping element to form the orifice, and wherein the orifice has a distal end formed in the substantially planar portion and a proximal end spaced from the substantially planar portion, and wherein an end of the third shaping element is structured to abut an end of the fifth shaping element to form a sealing surface surrounding the distal end of the orifice.

3. The injection mold of claim 2, wherein the end of the fifth shaping element has a diameter that is wider than a diameter of the end of the third shaping element.

4. The injection mold of claim 2, wherein the fifth shaping element is structured to form a beveled surface surrounding the sealing surface, the beveled surface extending away from an orifice center line.

5. The injection mold of claim 1, wherein the third shaping element includes a distal end structured to form the distal end of the orifice and a proximal end structured to form the proximal end of the orifice, and wherein the third shaping element tapers towards a center line of the orifice from the proximal end to the distal end.

6. The injection mold of claim 1, wherein the fourth shaping element is structured to form first and second guide pin holes in the cross member; first and second guide pin holes being oriented such that an orifice center line substantially bisects a line drawn between a center of the first guide pin hole and a center of the second guide pin hole.

7. A method for producing a sprinkler head part comprising:
    injecting a composite material in molten form into a mold to form a molded product, the mold comprising:
        first and second mold portions including first and second shaping elements structured to cooperatively form a body, which comprises a substantially planar portion, a first frame arm extending from the substantially planar portion, the first frame arm defining a first frame arm axis, and a second frame arm extending from the substantially planar portion, the second frame arm defining a second frame arm axis;
        a third mold portion including a third shaping element structured to form an orifice in the body which extends through the substantially planar portion; and a fourth mold portion including a fourth shaping element structured to form a cross member connecting the first frame arm and the second frame arm;

wherein injecting the molten composite material is controlled to provide the molded product having a fiber orientation predominantly in a direction parallel to an axial direction of the first and second frame arms.

8. The method of claim 7, wherein injecting the molten composite material is controlled to provide the molded product comprising a knit line located proximate a center of the cross member.

9. The method of claim 7, wherein the composite material comprises thermoplastic polymeric resin and reinforcing fibers; and the thermoplastic polymeric resin has a peak melting temperature of at least about 250° C. (as determined pursuant to ASTM D3418); a water absorption of no more than about 0.3 wt. % (as determined pursuant to ASTM D570); and the composite material has a coefficient of thermal expansion of no more than about 100 microns/m (as determined pursuant to ASTM E831).

10. The method of claim 7, wherein the composite material comprises:

(a) thermoplastic polymeric resin selected from the group consisting of polyphenylene pulfide (PPS), polyetheretherketone (PEEK), polyetherketoneketone (PEKK), polyphthalamide (PPA), polyimide (TPI), polyamide (PA), polysulfone (PSU), polyethersulfone (PES), polyetherimide (PEI), liquid crystal polymer (LCP) and mixtures of two or more thereof; and (b) reinforcing fibers selected from the group consisting of glass fibers, carbon fibers, aramid fibers and mixtures of two or more thereof.

11. The method of claim 10, wherein the composite material comprises about 25 to 45 wt. % glass fibers and/or carbon fibers; and the thermoplastic polymeric resin comprises polyphenylenesulfide.

12. The method of claim 10, wherein the composite material comprises about 25 to 35 wt. % glass fibers and/or carbon fibers; and the thermoplastic polymeric resin comprises polyetherketoneketone.

13. The method of claim 10, wherein the composite material comprises about 25 to 35 wt. % glass fibers and/or carbon fibers; and the thermoplastic polymeric resin comprises polyetherimide.

14. The method of claim 10, wherein the composite material comprises about 20 to 35 wt. % glass fibers and/or carbon fibers; and the thermoplastic polymeric resin comprises polyphthalamide.

15. A method for producing a sprinkler head part comprising:

injecting a composite material in molten form into a mold to form a molded product, the mold comprising:

first and second mold portions including first and second shaping elements structured to cooperatively form a body, which comprises a substantially planar portion, a first frame arm extending from the substantially planar portion at a first frame arm/planar portion junction and a second frame arm extending from the substantially planar portion at a second frame arm/planar portion junction;

a third mold portion including a third shaping element structured to form an orifice in the body; and a fourth mold portion including a fourth shaping element structured to from a cross member between the first frame arm at a first frame arm/cross member junction and the second frame arm at a second frame arm/cross member junction;

wherein the mold has two injection gates each disposed at a frame arm/cross member junction or each disposed at a frame arm/planar portion junction.

16. The method of claim 15, wherein the thermoplastic polymeric resin comprises polyphenylenesulfide, polyphthalamide, polyetheretherketone (PEEK), polyetherimide and mixtures of two or more thereof; and the reinforcing fibers comprise glass fibers, carbon fibers, aramid fibers and mixtures of two or more thereof.

17. The method of claim 9, wherein the composite material has an elongation at break of no more than about 3% (as determined pursuant to ASTM D638).

18. The method of claim 9, wherein the composite material has a tensile strength of at least about 150 MPa (as determined pursuant to ASTM D638).

19. The method of claim 9, wherein the composite material has a transverse molding shrinkage of no more than about 1% (as determined pursuant to ISO 294-24, 2577).

20. The method of claim 9, wherein the composite material has a melt flow index at 400° C. of at least about 1 g/10 min.

* * * * *